(12) United States Patent
Fukuda

(10) Patent No.: US 10,798,314 B2
(45) Date of Patent: Oct. 6, 2020

(54) IMAGING APPARATUS AND DISPLAY METHOD

(71) Applicant: OLYMPUS CORPORATION, Hachioji-shi, Tokyo (JP)

(72) Inventor: Takanori Fukuda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/456,440

(22) Filed: Jun. 28, 2019

(65) Prior Publication Data

US 2020/0014862 A1    Jan. 9, 2020

(30) Foreign Application Priority Data

Jul. 5, 2018    (JP) .................................. 2018-128405

(51) Int. Cl.
    *H04N 5/235*    (2006.01)
    *H04N 5/265*    (2006.01)

(52) U.S. Cl.
    CPC ........... *H04N 5/265* (2013.01); *H04N 5/2353* (2013.01)

(58) Field of Classification Search
    CPC ..... H04N 5/265; H04N 5/2353; H04N 5/2625
    See application file for complete search history.

(56) References Cited

U.S. PATENT DOCUMENTS

2010/0201847 A1* 8/2010 Lee ...................... H04N 5/232
                                                 348/234
2010/0231748 A1* 9/2010 Takeda .................... G03B 5/00
                                                 348/229.1

FOREIGN PATENT DOCUMENTS

JP        2008-079222 A      4/2008
JP        2019-92018 A       6/2019

* cited by examiner

*Primary Examiner* — Mekonnen D Dagnew
(74) *Attorney, Agent, or Firm* — Volpe & Koenig, P.C.

(57) ABSTRACT

An imaging apparatus includes an exposure time setting circuit; an imaging sensor; a microcomputer that includes a synthesis process setting unit; an image processing circuit that includes an image synthesis circuit; and a display. The imaging sensor repeats exposure and output of an image signal at a specified time interval; the synthesis process setting unit sets, in the image synthesis circuit, a synthesis processing method for making brightness of a synthesized image generated by the image synthesis circuit to be specified brightness; the image synthesis circuit generates a synthesized image to be an image corresponding to an exposure time set by the exposure time setting circuit, by synthesizing a plurality of images based on image signals repeatedly output by the image sensor according to a synthesis processing method set by the synthesis process setting unit; and the display displays an image based on the synthesized image.

21 Claims, 26 Drawing Sheets

LONG-TIME LIVE VIEW FUNCTION OFF　　　LONG-TIME LIVE VIEW FUNCTION ON

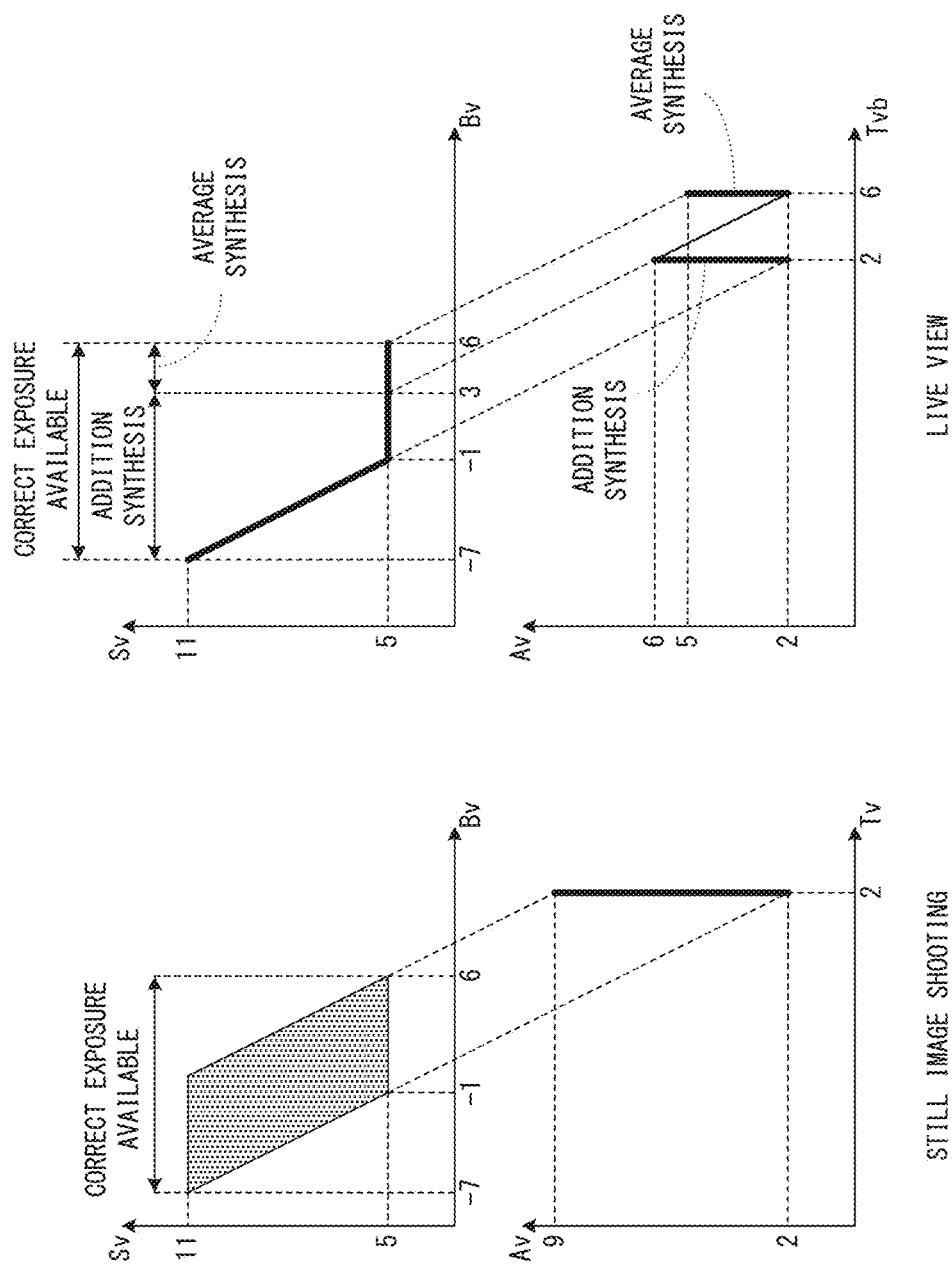
F I G. 8

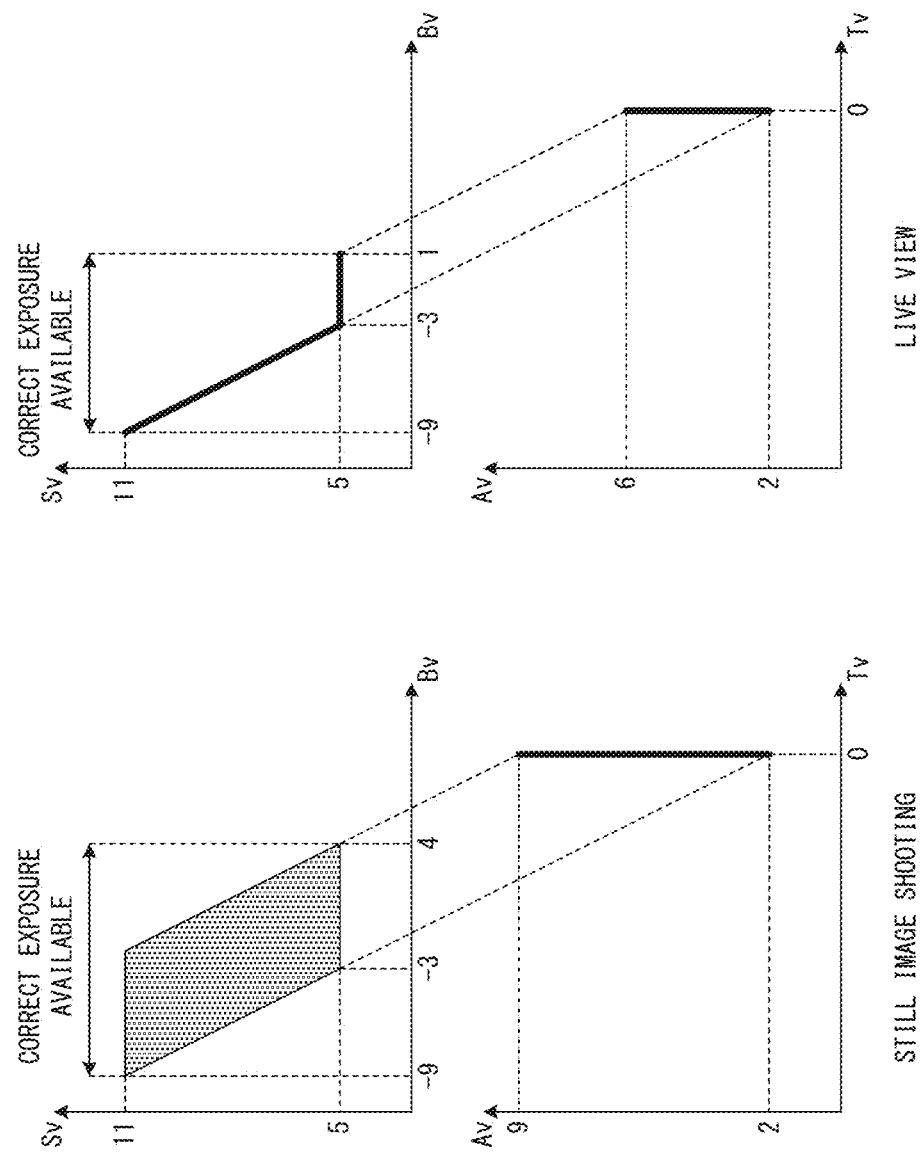
F I G. 26

IMAGING APPARATUS AND DISPLAY METHOD

CROSS REFERENCE TO RELATED APPLICATIONS

This application is based upon and claims the benefit of priority of the prior Japanese Patent Application No. 2018-128405, filed on Jul. 5, 2018, the entire contents of which are incorporated herein by reference.

FIELD

The embodiments disclosed herein relate to an imaging apparatus such as a digital still camera, a digital video camera, and the like, and to a display method performed in the imaging apparatus.

BACKGROUND

In recent years, imaging apparatuses have become popular that are equipped with a function called "live view" that makes it possible to adjust, before the shooting, the settings at the time of shooting while looking at the finishing condition of the picture. The live view is a function with which capturing and displaying of images of the subject are repeatedly performed before the shooting. In the live view, the image brightness determined by the lens aperture and exposure correction, and effects determined by settings such as WB (White Balance) may be checked using the displayed image of the subject. Hereinafter, the display in the live view may be referred to as "live view display", and the image displayed in the live view may be referred to as a "live view image" as well.

Meanwhile, imaging apparatuses with which the effect determined by the setting of the shutter speed may be checked before the shooting have also been known. For example, Patent Document 1 (Japanese Laid-open Patent Publication No. 2008-79222) discloses a digital camera that images an image of the subject formed by the photographic lens at a specified time interval, also storing the imaged images from newest to oldest, and at a specified time interval, synthesizes at least the newest image and the image before the specified shutter speed among the images from the stored newest image to the image before the shutter speed specified in the setting and displays it as a through image (live view image).

SUMMARY

An aspect of the embodiments is an imaging apparatus including an exposure time setting circuit configured to set an exposure time for shooting; an imaging sensor configured to image an image of a subject; a microcomputer that includes a unit configured to perform processes as follows a synthesis process setting unit configured to set an synthesis processing method; an image processing circuit that includes an image synthesis circuit configured to generate a synthesized image according to a synthesis processing method set by the synthesis process setting unit; and a display configured to display an image, and the imaging sensor repeats exposure and output of an image signal at a specified time interval; the synthesis process setting unit sets, in the image synthesis circuit, a synthesis processing method for making brightness of a synthesized image generated by the image synthesis circuit to be specified brightness; the image synthesis circuit generates a synthesized image to be an image equivalent to an exposure time set by the exposure time setting circuit, by synthesizing a plurality of images based on image signals repeatedly output by the image sensor according to a synthesis processing method set by the synthesis process setting unit; and the display displays an image based on a synthesized image generated by the image synthesis circuit.

Another aspect of the embodiments is a display method including setting an exposure time for shooting; imaging an image of a subject; setting a synthesis processing method; generating a synthesized image according to the synthesis processing method; and displaying an image, and in the imaging of an image, exposure and output of an image signal is repeated at a specified time interval, in the setting of a synthesis processing method, a synthesis processing method is set for making brightness of a synthesized image generated by the generating of a synthesized image to be specified brightness, in the generating of a synthesized image, a synthesized image to be an image equivalent to an exposure time set by the setting of an exposure time is generated by synthesizing a plurality of images based on image signals repeatedly output by the imaging of an image according to a synthesis processing method set by the setting of a synthesis processing method, and in the displaying, an image based on a synthesized image generated by the generating of a synthesized image is displayed.

BRIEF DESCRIPTION OF DRAWINGS

FIG. 8 illustrates another example a program chart for still image shooting and a program chart for live view according to the first embodiment;

FIG. 26 illustrates an example of a program chart for still image shooting and a program chart for live view.

DESCRIPTION OF EMBODIMENTS

In the live view, in order to secure the AF (Auto Focus) function and image quality, the shooting conditions such as the aperture and the imaging sensitivity are usually limited. In the method disclosed in Patent Document 1, while it is possible to perform live view display of an image with the simulation of the shutter speed, under the limitations of the imaging conditions mentioned above, it is impossible in some cases to display an image of the appropriate brightness according to the luminance of the subject. An example of such a case is explained using FIG. 26.

FIG. 26 illustrates an example of a program chart for still image shooting and a program chart for live view.

Meanwhile, the program chart illustrates the relationship between Bv, Av, and Tv for obtaining the correct exposure. Here, Bv is the APEX (Additive System of Photographic Exposure) value corresponding to the subject luminance. Sv is the APEX value corresponding to the imaging sensitivity. Av is the APEX value corresponding to the aperture. Tv is the APEX value corresponding to the shutter speed.

In this example, it is assumed that, with the camera, Av may be changed arbitrarily from 2 to 9 for still image shooting, but for the live view, the upper value of Av is limited as 6.

Under this assumption, in a case in which still image shooting is performed with the shutter speed set to 1 second corresponding to Tv=0, as illustrated in the program chart for still image shooting, shooting with the correct exposure may be performed in the range of $-9 \leq Bv \leq 4$.

Meanwhile, in the live view, it is assumed that a synthesized image corresponding to Tv=0 is displayed as a live view image by synthesizing a plurality of images for example by addition synthesis according to the method in Patent Document 1. In this case, it is also desirable to display the same Bv range as that for the still image shooting, but the upper limit of Av is restricted to 6, and therefore, as illustrated in the program chart for live view, only the range of Bv $-9 \leq Bv \leq 1$ may be displayed with the correct exposure, and the range of Bv $1 < Bv \leq 4$ is displayed with overexposure. Meanwhile, Tv presented in the program chart for live view in FIG. 26 represents Tv corresponding to the brightness of the live view image that is a synthesized image.

The embodiments explained below provides, in view of the current situation described above, an imaging apparatus and a display method with which, in the live view display, shooting effects in the case in which the shutter speed is set to a low speed may be obtained, and at the same time, an image of an appropriate brightness may be obtained.

Hereinafter, embodiments are explained with reference to the drawings.

First Embodiment

Figure 1:
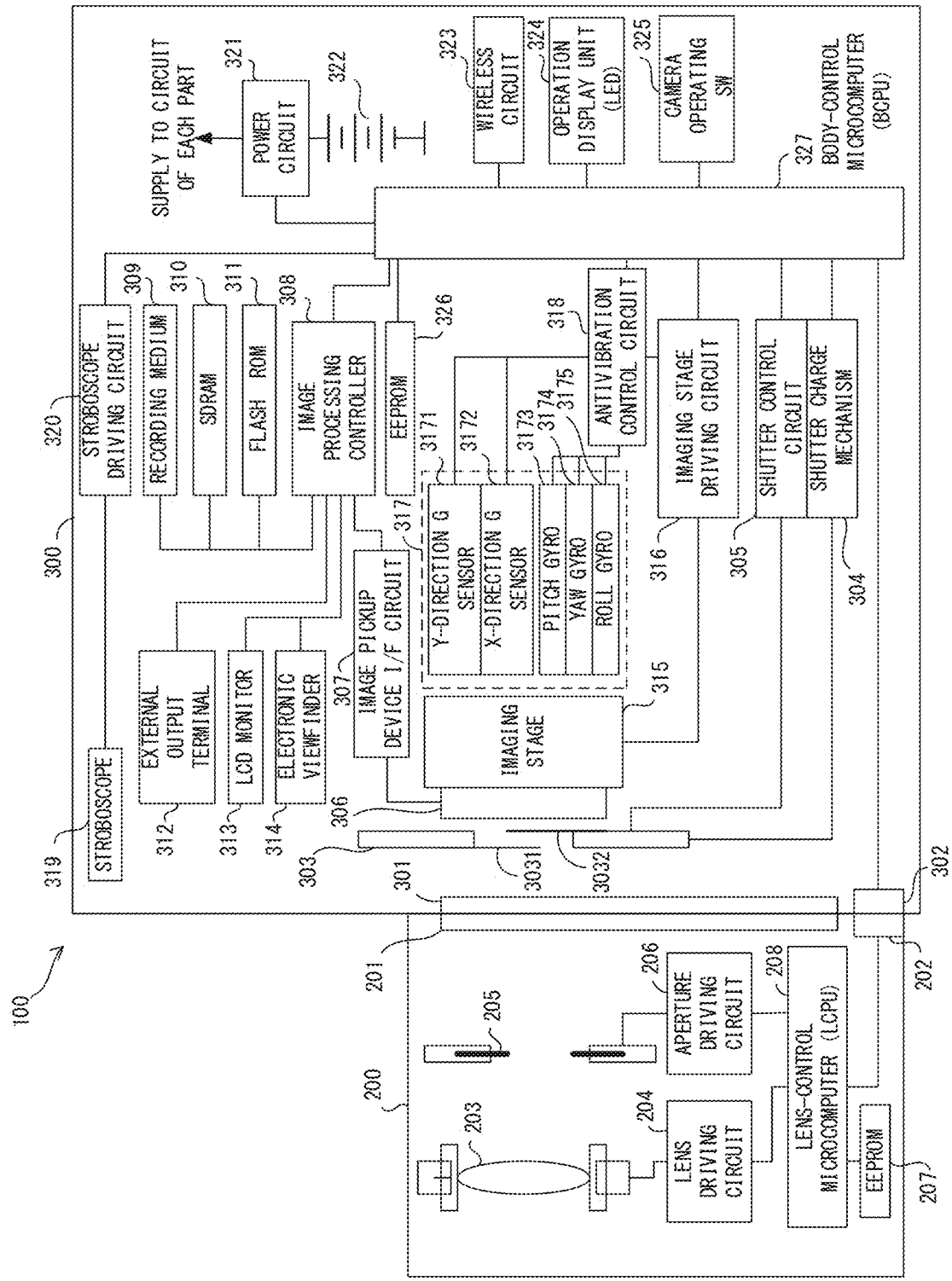
FIG. 1 illustrates an example of the configuration of a camera that is an imaging apparatus according to the first embodiment.

FIG. 1 illustrates an example of the configuration of a camera that is an imaging apparatus according to the first embodiment.

As illustrated in FIG. 1, a camera 100 has a configuration in which a lens unit 200 is installed on the body unit 300. The body unit 300 is configured so that the lens unit 200 is installable/detachable. The installation of the lens unit 200 on the body unit 300 is performed with a body-side mount part 301 provided in the body unit 300 and a lens-side mount part 201 provided in the lens unit 200 engaging with each other. Accordingly, then lens unit 200 is fixed on the body unit 300, and also, a lens-side communication connector 202 provided in the lens unit 200 and a body-side communication connector 302 provided in the body unit 300 are electrically connected, and communication between the lens unit 200 and the body unit 300 becomes available.

The lens unit 200 includes a shooting lens 203, a lens driving circuit 204, an aperture 205, an aperture driving circuit 206, an EEPROM (Electrically Erasable Programmable Read-Only Memory) 207, and a lens-control microcomputer (hereinafter, referred to as "LCPU") 208.

The shooting lens 203 forms a subject image that is an optical image of the subject on the imaging surface of an image pickup device 306. In FIG. 1, for the sake of convenience of explanation, the shooting lens 203 is illustrates as one lens, but it is actually composed of a plurality of lenses including a focus lens, a zoom lens and the like.

The lens driving circuit 204 drives the focus lens, the zoom lens and the like included in the shooting lens 203, under the control by the LCPU 208. The lens driving circuit 204 is configured including a stepping motor, a motor driver and the like. The motor driver is also referred to as a "motor drive circuit".

The aperture 205 adjusts the light quantity of the subject image formed on the imaging surface by changing the aperture area. Accordingly, the exposure is adjusted.

The aperture driving circuit 206 drives the aperture 205 under the control of the LCPU 208. The aperture driving circuit 206 is configured including a stepping motor, a motor driver and the like.

The EEPROM 207 stores a program for controlling the operation of the lens unit 200, data required for the execution of the program, information regarding the lens unit 200, and the like. Information regarding the lens unit 200 includes information of the shooting lens 203.

The LCPU 208 includes a processor such as a CPU (Central Processing Unit) for example and executes the program stored in the EEPROM 207. Accordingly, the LCPU 208 communicates with a body-control microcomputer (hereinafter, referred to as "BCPU") via a lens-side communication connector 202 and controls each part of the lens unit 200 to control the overall operation of the lens unit 200, under the control of the BCPU 327. Meanwhile, the LCPU 208 may also be composed of a special-purpose circuit such as an ASIC (application specific integrated circuit), an FPGA (field-programmable gate array) or the like.

The body unit 300 includes a shutter 303, a shutter charge mechanism 304, a shutter control circuit 305, an image pickup device 306, an image pickup device interface circuit (hereinafter, referred to as "image pickup device I/F circuit") 307, an image processing controller 308, a recording medium 309, an SDRAM (Synchronous Dynamic Random Access Memory) 310, a flash ROM (Read Only Memory) 311, an external output terminal 312, an LCD monitor 313, an electronic viewfinder 314, an imaging stage 315, an imaging stage driving circuit 316, a posture change detecting unit 317, an antivibration control circuit 318, a stroboscope 319, a stroboscope driving circuit 320, a power circuit 321, a battery 322, a wireless circuit 323, an operation display unit 324, a camera operating SW (switch) 325, an EEPROM 326, and the BCPU 327.

The shutter 303 sets the imaging surface of the image pickup device 306 to the exposed state or the light-shielded state by performing opening and closing operations of a front curtain 3031 and a rear curtain 3032. The shutter 303 is, for example, a focal plane shutter.

The shutter charge mechanism 304 charges the spring that drives the front curtain 3031 and the rear curtain 3032 of the shutter 303 under the control of the BCPU 327.

The shutter control circuit 305 controls the operation of the shutter 303 under the control of the BCPU 327. Specifically, the operations of the front curtain 3031 and the rear curtain 3032 are controlled.

The image pickup device 306 converts a subject image formed on the imaging surface into an electrical signal. That is, the subject image is imaged. The image pickup device 306 is an image sensor such as a CCD (charge coupled device) or a CMOS (complementary metal oxide semiconductor) or the like.

The image pickup device I/F circuit 307 controls the operation of the image pickup device 306 and also outputs the image signal output from the image pickup device 306 to the image processing controller 308, under the control of the BCPU 327. Meanwhile, the control of the image pickup device I/F circuit 307 by the BCPU 327 is performed through the image processing controller 308.

The image processing controller 308 applies various image processes such as y correction, color conversion, demosaicing and the like to the image signal output from the image pickup device 306 to generate image data (hereinafter, simply be referred to as an "image" as well), under the control of the BCPU 327. For example, image processes suitable for live view are applied to generate an image for live view, and image processes suitable for recording are applied to generate an image for recording. Meanwhile, the image processes suitable for live view and the image processes suitable for recording may also be referred to as developing processes. In addition, the image processing controller 308 generates a synthesized image data (hereinafter, it may simply be referred to as a "synthesized image" as well) according to the synthesis process method set by the BCPU 327, under the control of the BCPU 327. In addition, the image processing controller 308 applies, to the generated synthesized image, image processes suitable for live view to generate an image for live view and applies image processes suitable for recording to generate an image for recording, under the control of the BCPU 327. In addition, the image processing controller 308 generates an image for playback by applying image processes including an expansion process to an image recorded in the recording medium 309, under the control of the BCPU 327. Meanwhile, the image processing controller 308 may be composed of a special-purpose circuit such as an ASIC, an FPGA or the like and may also be configured including a processor such as a CPU.

The recording medium 309 is a non-volatile recording medium such as an SD card, a compact flash (registered trademark) and the like that are insertable/detachable to/from the body unit 300. Meanwhile, the recording medium 309 may be a hard disk, a semiconductor memory, and the like that is incorporated in the body unit 300. The recording medium 309 records an image generated by the image processing controller 308, for example.

The SDRAM 310 is used as a work area of the image processing controller 308, and for example, an image being processed by the image processing controller 308 is temporality stored.

The flash ROM 311 stores various parameters and the like required for image processing by the image processing controller 308. Meanwhile, when the image processing controller 308 is configured including a processor, the flash ROM 311 may store a program that may be executed by the processor, data or the like required for the execution of the program, and the like.

The external output terminal 312 is connected to an external apparatus via a cable and outputs the image generated by the image processing controller 308 to the external apparatus, for example.

The LCD monitor 313 displays the image generated by the image processing controller 308, various information, and the like.

The electronic viewfinder 314 displays the image generated by the image processing controller 308, various information, and the like, in a similar manner to the LCD monitor 313.

The imaging stage 315 is a driving mechanism that moves the image pickup device 306 in a direction parallel to the imaging surface and also makes the image pickup device 306 rotate with the rotation axis being an axis orthogonal to the imaging surface. The imaging stage 315 is configured including a plurality of actuators for the parallel movement and rotation of the image pickup device 306. The plurality of actuators are, for example, VCMs (Voice Coil Motors).

The imaging stage driving circuit 316 drives the imaging stage 315 under the control of the BCPU 327 and the antivibration control circuit 318.

The posture change detecting unit 317 detects changes in the posture of the camera 100. The posture change detecting unit 317 includes a Y-direction G sensor 3171, an X-direction G sensor 3172, a pitch gyro sensor (hereinafter, simply referred to as a "pitch gyro) 3173, the yaw gyro sensor (hereinafter, simply referred to as "yaw gyro") 3174, and a roll gyro sensor (hereinafter, simply referred to as "roll gyro") 3175. Meanwhile, in the present embodiment, the direction of the optical axis of the shooting lens 203 is assumed as the Z direction, and the parallel direction and the vertical direction being the two directions that are orthogonal to the direction of the optical axis and that are also orthogonal to each other are assumed as the X direction and the Y direction, respectively.

The Y-direction G sensor 3171 detects the acceleration of the camera 100 in the Y-direction.

The X-direction G sensor 3172 detects the acceleration of the camera 100 in the X direction.

The pitch gyro 3173 detects the rotation angular speed of the camera 100 in the pitch direction. Here, the rotation angular speed of the camera 100 in the pitch direction is also the rotation angular speed of the camera 100 with the rotation axis being the axis in the X direction.

The yaw gyro 3174 detects the rotation angular speed of the camera 100 in the yaw direction. Here, the rotation angular speed of the camera 100 in the yaw direction is also the rotation angular speed of the camera 100 with the rotation axis being the axis in the Y direction.

The roll gyro 3175 detects the rotation angular speed of the camera 100 in the roll direction. Here, the rotation angular speed of the camera 100 in the roll direction is also the rotation angular speed of the camera 100 with the rotation axis being the axis in the Z direction.

The antivibration control circuit 318 moves the image pickup device 306 in the direction that cancels the image blurring of the subject image formed on the imaging surface of the image pickup device 306, by controlling the imaging stage driving circuit 316 according to the detection result of each of the Y-direction G sensor 3171, the X-direction G sensor 3172, the pitch gyro 3173, the yaw gyro 3174, and the roll gyro 3175 being the detection result of the posture change detecting unit 317, under the control of the BCPU 327.

The stroboscope 319 emits light in synchronization with the operation of the shutter 303 that is an exposure operation. The stroboscope 319 includes, as the light source, a xenon lamp or an LED (Light Emitting Diode), for example.

The stroboscope driving circuit 320 drives the stroboscope 319 to make it emit light, under the control of the BCPU 327.

The power circuit 321 converts and supplies the voltage of the battery 322 into a voltage required by each part of the camera 100, under the control of the BCPU 327.

The wireless circuit 323 performs wireless communication with an external apparatus not illustrated in the drawing and outputs the image generated by the image processing controller 308 for example, under the control of the BCPU 327.

The operation display unit 324 is equipped with an LED for notifying the user of the operation state of the camera 100 and turns on or off the LED according to the operation state of the camera 100, under the control of the BCPU 327.

The camera operating SW 325 is equipped with various switches such as a power switch (hereinafter, referred to as the "power SW") for receiving the input of instructions for switching the power of the camera 100 to the on state or to the off state, a release switch for receiving the input of shooting instructions, a mode switching switch for switching the operation mode to the still image shooting mode, the moving image shooting mode, or the playback mode, a menu switch for receiving the input of instructions for displaying the menu screen, a selection switch for receiving the input of instructions for selecting the items on the menu screen, and a confirmation switch for receiving the input of instructions to confirm the selected item, and the like. The menu screen is displayed on the LCD monitor 313 or the electronic viewfinder 314. For example, the shooting conditions such as the shutter speed and exposure and the like for shooting may be input and set from the menu screen by the operations of the menu switch, the selection switch and the confirmation switch. Meanwhile, the shutter speed for shooting corresponds to the exposure time at the time of shooting.

The EEPROM 326 stores a program for controlling the operations of the camera 100, data required for the execution of the program, and the like.

The BCPU 327 includes a processor such as a CPU for example and executes the program stored in the EEPROM 326. Accordingly, the BCPU 327 communicates with the LCPU 208 via a body-side communication connector 302 and also controls each part of the camera 100 to control the overall operation of the camera 100. For example, the setting of the shooting conditions such as the shutter speed, exposure and the like for shooting input by the operations of the camera operating SW 325 and the setting of the synthesis process method for the image processing controller 308 are done by the BCPU 327. Meanwhile, the BCPU 327 may be composed of a special-purpose circuit such as ASIC, FPGA or the like, for example.

Next, processes performed in the camera 100 are explained. Processes performed in the camera 100 are done under the control of the BCPU 327.

Figure 2:
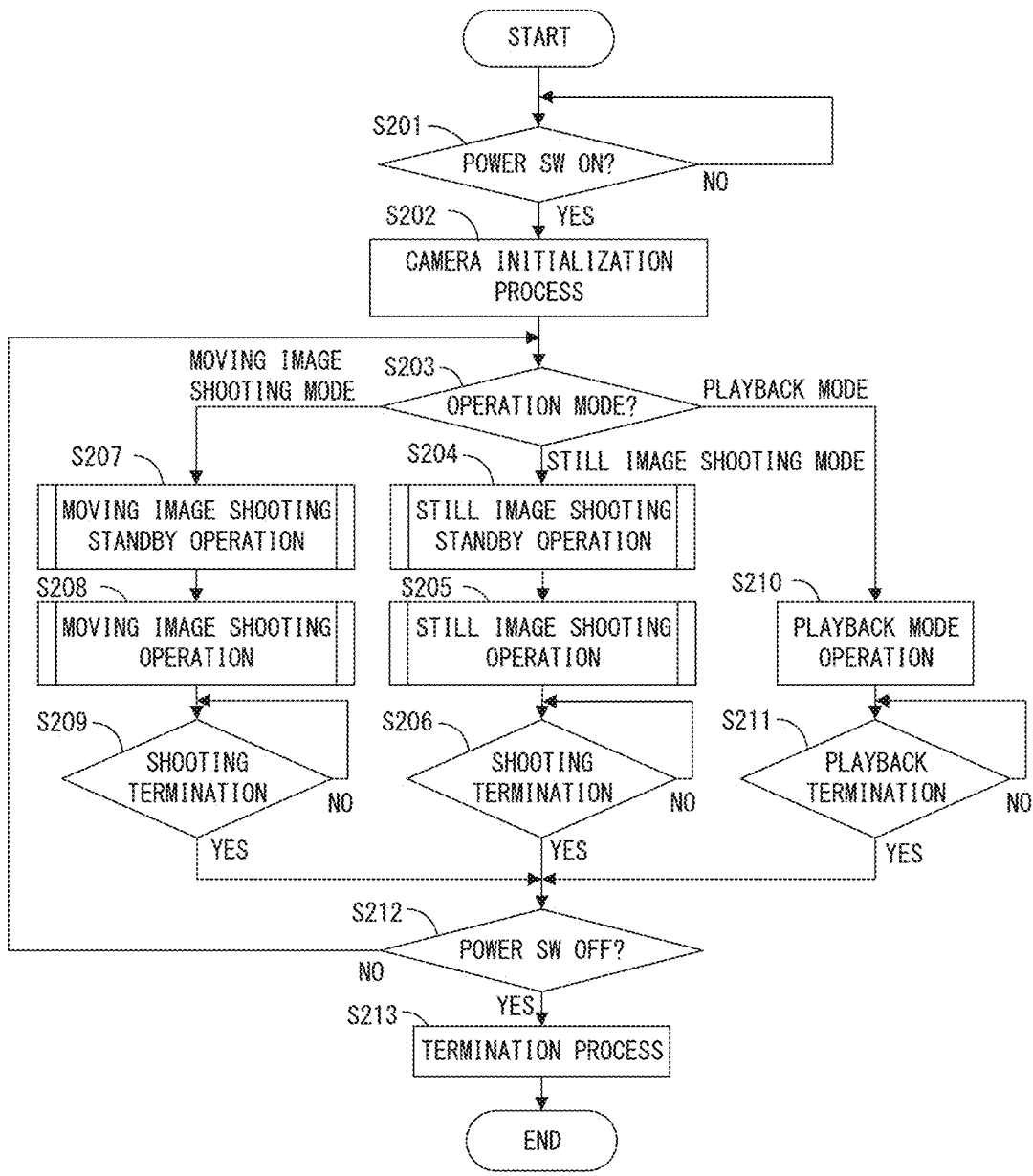
FIG. 2 is a flowchart illustrating the flow of the main process executed in the camera.

FIG. 2 is a flowchart illustrating the flow of the main process executed in the camera 100.

As illustrated in FIG. 2, in the main process, first in S201, the BCPU 327 determines whether or not the power of the camera 100 has been turned to the on state, according to the power SW of the camera operating SW 325.

When the determination result in S201 is NO, the determination in S201 is repeated.

On the other hand, when the judgment result in S201 is YES, the BCPU 327 performs a camera initialization process. In this process, for example, a process for obtaining information regarding the lens unit 200 from the LCPU 208, or the like is performed.

In S203, the BCPU 327 determines which of the still image shooting mode, the moving image shooting mode, and the playback mode has been set as the operation mode. Meanwhile, the switching of the operation mode is performed by the mode switching switch of the camera operating SW 325.

When the determination result in S203 is the still image shooting mode, in S204, the BCPU 327 performs a still image shooting standby operation process. Details of this process are described later using FIG. 3.

When a still image shooting instruction is given during the process of S204, in S205, the BCPU 327 performs a still image shooting operation process. In the present embodiment, a process for performing still image shooting operation is performed in which a still image of the subject is captured according to the set shooting conditions such as the shutter speed, exposure and the like, and the still image is recorded in the recording medium 309.

In S206, the BCPU 327 determines whether or not the still image shooting operation has been terminated.

When the determination result in S206 is NO, the determination in S206 is repeated.

On the other hand, when the determination result in S206 is YES, the process proceeds to S212.

When the determination result in S203 is the moving image shooting mode, in S207, the BCPU 327 performs a moving image shooting standby operation process. In the present embodiment, a process is performed for repeating operations in which the subject image is captured and displayed on the LCD monitor 313 or the electronic viewfinder 314.

When a moving image shooting start instruction is given during the process of S207, in S208, the BCPU 327 performs a moving image shooting operation process. In the present embodiment, a process is performed for performing moving image shooting operations in which a moving image of the subject are captured according to the set shooting conditions such as the shutter speed, exposure and the like, and the moving image is recorded in the recording medium 309, until a moving image shooting termination instruction is given.

In S209, the BCPU 327 determines whether or not the moving image shooting operation has been terminated.

When the determination result in S209 is NO, the determination in S209 is repeated.

On the other hand, when the determination result in S209 is YES, the process proceeds to S212.

When the determination result in S203 is the playback mode, in S210, the BCPU 327 performs a playback mode operation process. In this process, for example, a process is performed for performing a playback-mode operation in which image data recorded in the recording medium 309 are displayed on the LCD monitor 313.

In S211, the BCPU 327 determines whether or not the playback-mode operation has been terminated.

When the determination result in S211 is NO, the determination in S211 is repeated.

On the other hand, when the determination result in S211 is YES, the process proceeds to S212.

In S212, the BCPU 327 determines when or not the power of the camera 100 has been turned to the off state, according to the power SW of the camera operating SW 325.

When the determination result in S212 is NO, the process returns to S203.

On the other hand, when the determination result in S212 is YES, in S213, the BCPU 327 performs a termination process, and the main process illustrated in FIG. 2 is terminated.

Figure 3:
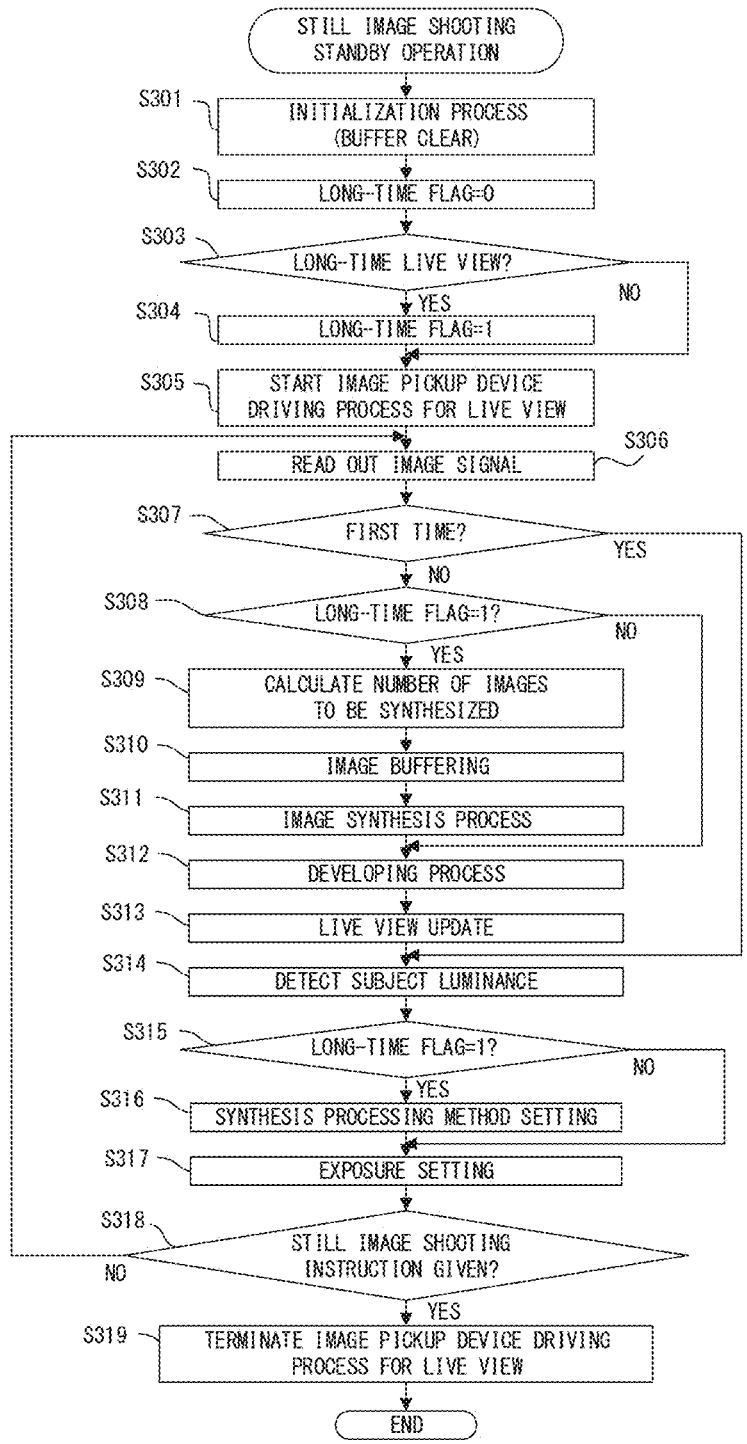
FIG. 3 is a flowchart illustrating the flow of a still image shooting standby operation process (S204) according to the first embodiment.

FIG. 3 is a flowchart illustrating the flow of the still image shooting standby operation process (S204) according to the first embodiment.

As illustrated in FIG. 3 in the still image shooting standby operation process, first in S301, the BCPU 327 performs an initialization process. In this process, a buffer clear process or the like are performed. The buffer clear process is a process for clearing the SDRAM 310.

In S302, the BCPU 327 sets the long-time flag to 0. The long-time flag is a flag that is set to 0 when the long-time live view function is set to off and is set to 1 when the long-time live view function is set to on. The long-time live view function is a function with which effects according to the shutter speed for the time of long-time shooting may be checked before shooting and that is also simply referred to as "long-time live view" below. The shutter speed for the time of long-time shooting assumed here is a shutter speed that is lower than the shutter speed corresponding to the frame rate for live view. For example, assuming that the frame rate for live view is 120 frames/second, the assumed shutter speed at the time of long-time shooting is a shutter speed lower than $1/120$. On or off of the long-time live view function may be set from the menu screen by the menu switch, the selection switch and the confirmation switch of the camera operating SW 325. Meanwhile, on or off of the function may also be done not from the menu screen but using a dedicated switch. In this case, the camera operating SW 325 may be equipped with a switch for receiving the input of instructions for selecting on or off of the long-time live view function. Alternatively, the long-time live view function may be set to on only when the switch is pressed or only when the release switch is half-pressed.

In S303, the BCPU 327 determines whether or not the long-time live view function is set to on.

When the determination result in S303 is YES, in S304, the BCPU 327 sets the long-time flag to 1, and the process proceeds to S305.

On the other hand, When the determination result in S303 is NO, the process proceeds to S305.

In S305, the BCPU 327 starts an image pickup device driving process for live view. The image pickup device driving process for live view is a process in which capturing of the subject image and output of image signals are repeated according to the frame rate for live view.

In S306, the image pickup device I/F circuit 307 reads out, from the image pickup device 306, and outputs, to the image processing controller 308, image signals for one frame from the image pickup device 306. This also corresponds to the image pickup device I/F circuit 307 outputting, to the image processing controller 308, image signals for one frame that have been output from the image pickup device 306.

In S307, the BCPU 327 determines whether or not the process in the current S307 is performed for the first time after the start of the still image shooting standby operation process illustrated in FIG. 3.

When the determination result in S307 is YES, the process proceeds to S314.

Meanwhile, when the determination result in S307 is NO, in S308, the BCPU 327 determines whether or not the long-time flag is set to 1.

When the determination result in S308 is NO, the process proceeds to S312.

On the other hand, when the determination result in S308 is YES, in S309, the BCPU 327 calculates the number of images to be synthesized. The number of images to be synthesized is the number of images used for the synthesis of the synthesized image in the image synthesis process (S311) described later. For example, assuming the exposure time of one frame of the image pickup device 306 as 1/(the frame rate for live view), the number of images to be synthesized is calculated as (the set shutter speed for shooting)/(1/(the frame rate for live view)). For example, assuming that the set shutter speed for shooting is $1/15$ of a second and the frame rate for live view is 120 frames/second, the number of images to be synthesized is 8, according to $(1/15)/(1/120)=8$. However, according to this calculation method, the value of the calculation result may include figures after the decimal point and may not always be an integer value. therefore, when the value of the calculation result includes figures after the decimal point, the value of the calculation result is obtained as an integer value by rounding up, rounding down, or rounding off. Alternatively, in order for making the value of the calculation result an integer value, the frame rate for live view may be changed.

In S310, the image processing controller 308 performs image buffering in which an image according to image signals read out from the image pickup device 306 in S306 is stored in the SDRAM 310, under the control of the BCPU 327. The image stored in the SDRAM 310 at this time is also referred to as a "buffering image" below.

In S311, the image processing controller 308 performs am image synthesis process in which a synthesized image that is an image equivalent to an image exposed for an exposure time corresponding to the set shutter speed for shooting by synthesizing buffering images stored in the SDRAM 310 corresponding to the number of images to be synthesized according to the synthesis process method set in S316 described later, under the control of the BCPU 327. Here, the number of images to be synthesized is the number of images to be synthesized calculated in S309. Meanwhile, the image equivalent to an image exposed for an exposure time corresponding to the set shutter speed for shooting is also an image in the case in which the shutter speed is extended artificially to the shutter speed for shooting.

However, when buffering images corresponding to the number of images to be synthesized are not stored in the SDRAM 310 in S311, or the number of images to be synthesized calculated in S309 is equal to or smaller than 1, the process proceeds to S312 without generating the synthesized image.

When the generation of the synthesized image is performed in S311, assuming the buffering image that was last store in the SDRAM 310 as an i-th stored image and the number of images to be synthesized calculated in S309 as N, the buffering images corresponding to the number of images to be synthesized used for the generation of the synthesized image are the N pieces of buffering images stored from i−N+1th to i-th. Meanwhile, the generation of the synthesized image is performed by synthesizing buffering images corresponding to the number of images to be synthesized according to the synthesis process method set by the BCPU 327, and its details are described later.

In S312, the image processing controller 308 performs a developing process under the control of the BCPU 327. Specifically, in S312 after S311, the developing process is applied to the synthesized image generated in S311. However, in the case in which the generation of the synthesized image was not performed in S311, the developing process is applied to the buffering image that was last stored in the SDRAM 310 in S310. On the other hand, in S312 in the case in which the determination result in S308 is NO, the developing process is applied to the image corresponding to the image signals read out in S306. Meanwhile, the image to which the developing process has been applied in S312 is also a live view image.

In S313, the BCPU 327 performs a live view update process in which the image to which the developing process has been applied in S312 is displayed on the LCD monitor 313 or the electronic viewfinder 314, or the image displayed on the LCD monitor 313 or the electronic viewfinder 314 is replaced with the image to which the developing process has been applied in S312. Meanwhile, the display destination or the output destination of the image to which the developing process has been applied in S312 is not limited to the LCD monitor 313 or the electronic viewfinder 314 and may be an external display apparatus. In this case, the external display apparatus may be an external display apparatus connected to the external output terminal 312 or may be an external display apparatus wirelessly connected via the wireless circuit 323.

In S314, the image processing controller 308 detects the subject luminance under the control of the BCPU 327. The detection of the subject luminance is performed according to the image signals read out in S306, for example.

In S315, the BCPU 327 determines whether or not the long-time flag is set to 1.

When the determination result in S315 is NO, the process proceeds to S317.

On the other hand, when the determination result in S315 is YES, in S316, the BCPU 327 decides the synthesis process method used in the next image synthesis process (S311) and sets it in the image processing controller 308. The synthesis processing method is decided according to the program chart for live view corresponding to the set shutter speed for shooting and the value of Bv corresponding to the subject luminance detected in S314. The program chart for live view specifies the relationship between BV, Sv, Av, and Tvb for obtaining the correct exposure in the long-time live view and also specifies the synthesis processing method. Here, Tvb indicates Tv corresponding to the brightness of the live view image that is a synthesized image. The program chart for live view is prepared and stored for example in ROM 311 in advance for each of the shutter speeds for shooting available to be set. Alternatively, only the program chart corresponding to the shutter speed for shooting to be a reference may be stored, and the program charts corresponding to the other shutter speeds for the time of shooting may be obtained by calculation according to the program chart to be the reference. Details of the program chart for live view are described later. After S316, the process proceeds to S317.

In S317, the BCPU 327 sets the exposure. Specifically, in S317 after S316, the values of Av and Sv are determined according to the program chart and the value of Bv used in S316, and the driving of the aperture 205 and the setting of the imaging sensitivity are performed according to the determined values of Av and Sv. The driving of the aperture 205 is done by notifying the LCPU 208 of the determined value of Av and by the LCPU 208 controlling the aperture driving circuit 206 according to the value of Av. Meanwhile, the setting of the imaging sensitivity is done by setting the imaging sensitivity corresponding to the determined value of Sv in the image pickup device I/F circuit 307 via the image processing controller 308, and by the image pickup device I/F circuit 307 controlling the image pickup device 306 according to the setting. On the other hand, in S317 in the case when the determination result in S315 is NO, the driving of the aperture 205 and the setting of the imaging sensitivity are performed according to the subject luminance detected in S314.

In S318, the BCPU 327 determines whether or not a still image shooting instruction has been given. Meanwhile, the still image shooting instruction may be given by the release switch.

When the determination result in S318 is NO, the process returns to S306.

On the other hand, when the determination result in S318 is YES, in S319, the BCPU 327 terminates the image pickup device driving process for live view started in S305, and the still image shooting standby operation process illustrated in FIG. 3 is terminated.

Figure 4:
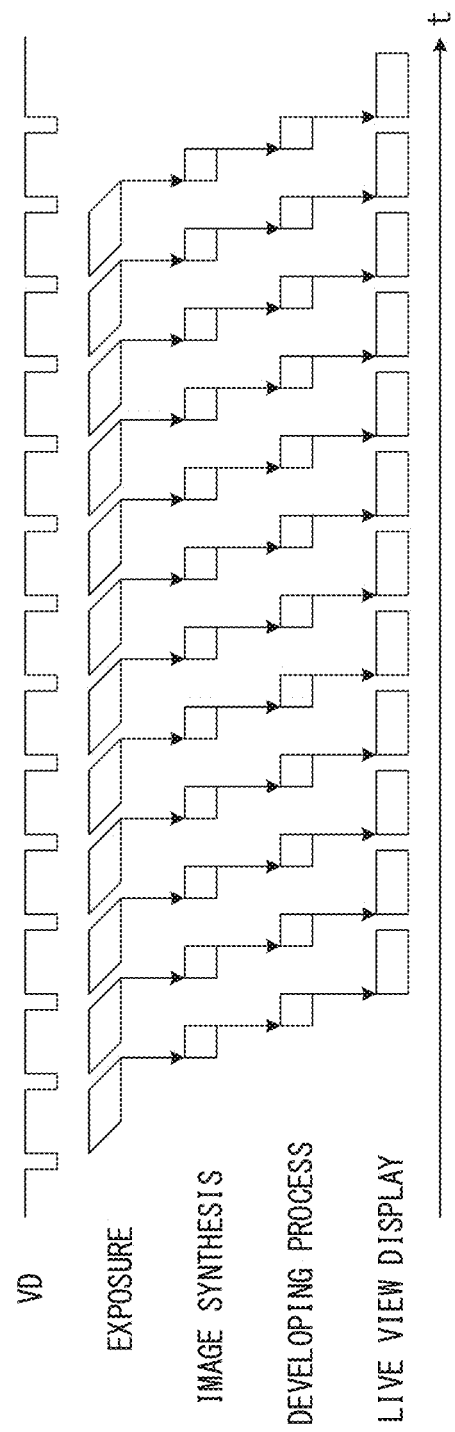
FIG. 4 is a timing chart of a live view operation performed according to the still image shooting standby operation process illustrated in FIG. 3.

FIG. 4 is a timing chart of a live view operation performed according to the still image shooting standby operation process illustrated in FIG. 3. Specifically, this live view operation illustrates the operation in which the image synthesis process (S311) is repeatedly performed in the still image shooting standby operation process illustrated in FIG. 3.

As illustrated in FIG. 4, in this live view operation, in synchronization with the rising of a vertical synchronization signal VD, a series of processes are repeated in which exposure for the exposure time corresponding to the frame rate for live view and output of the image signals are performed, and subsequently, an image synthesis process and a developing process are performed, and an image being the result of the processes are displayed. Here, the exposure corresponds to the imaging, the image being the result of processes corresponds to the live view image, and the display of it corresponds to the live view display.

Figure 5:
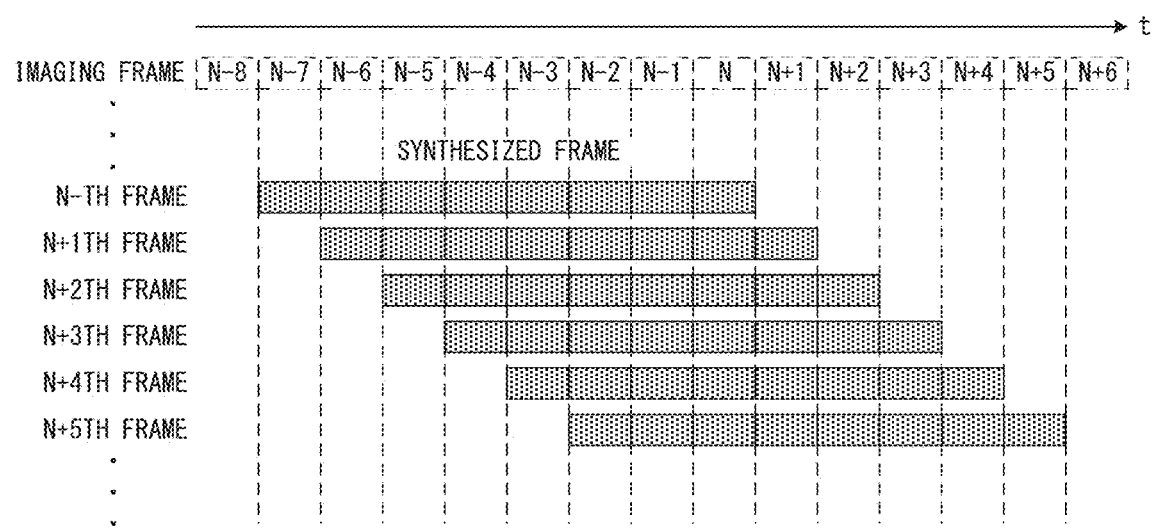
FIG. 5 is a schematic illustrating the relationship between an imaging frame and a synthesized frame during the execution of the still image shooting standby operation process illustrated in FIG. 3.

FIG. 5 is a schematic illustrating the relationship between an imaging frame and a synthesized frame during the execution of the still image shooting standby operation process illustrated in FIG. 3. Specifically, here, it is assumed that, during the execution of the still image shooting standby operation process, there are no changes in the number of images to be synthesized, and that the image synthesis process (S311) for generating the synthesized image is repeatedly performed. In addition, it is assumed that the frame rate for live view is 120 frames/second, and that 1/15 of a second is set as the shutter speed for shooting. In this case, assuming that the exposure time for one frame of the image pickup device 306 as 1/120 of a second, the number of images to be synthesized is 8 according to (1/15)/(1/120)=8.

As illustrated in FIG. 5, in this case, the number of images to be synthesized is 8, and therefore, the generation of a display frame image is performed using eight pieces of imaging frame images. Meanwhile, the imaging frame image is also a buffering image. That is, the generation of the display frame image is performed using eight imaging frame images exposed in a synthesized frame in which eight frames are synthesized. Meanwhile, the display frame image is an image that is to be the processing result of the developing process (S312).

For example, the update of the display frame image is performed while shifting the frames to be synthesized in a manner in which the display frame image of the N-th frame is generated and displayed using eight imaging frame images exposed in a synthesized frame in which the N−7th frame through the Nth frame are synthesized, and the display frame image of the N+1th frame is generated and displayed using eight imaging frame images exposed in a synthesized frame in which the N−6th frame through the N+1th frame are synthesized.

Figure 6:
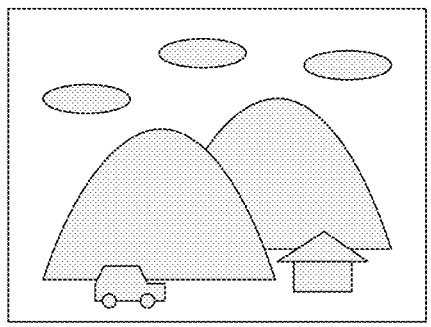
FIG. 6 schematically illustrates an example of a live view image displayed on an LCD monitor or an electronic viewfinder by live view update (S313)
Figure 6:
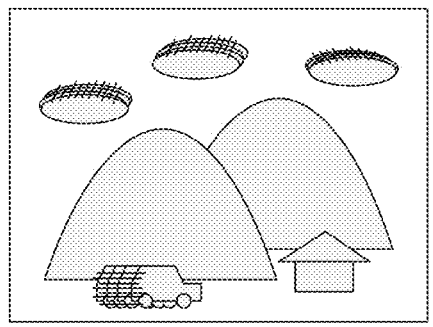

FIG. 6 schematically illustrates an example of a live view image displayed on the LCD monitor 313 or the electronic viewfinder 314 by live view update (S313).

The live view image presented on the left side of FIG. 6 is a live view image displayed when the long-time live view function is set to off. This live view image is an image in which the development process is applied to the image corresponding to image signals, that is, a live view image at a normal time.

The live view image presented on the right side of FIG. 6 is a live view image displayed when the long-time live view function is set to on. This live view image is an image in which the development process is applied to the synthesized image.

As illustrated in FIG. 6, according to the live view display with the live view image in the case when the long-time live view function is set to on, effects according to the long-time shutter speed for shooting may be checked before shooting.

Figure 7:
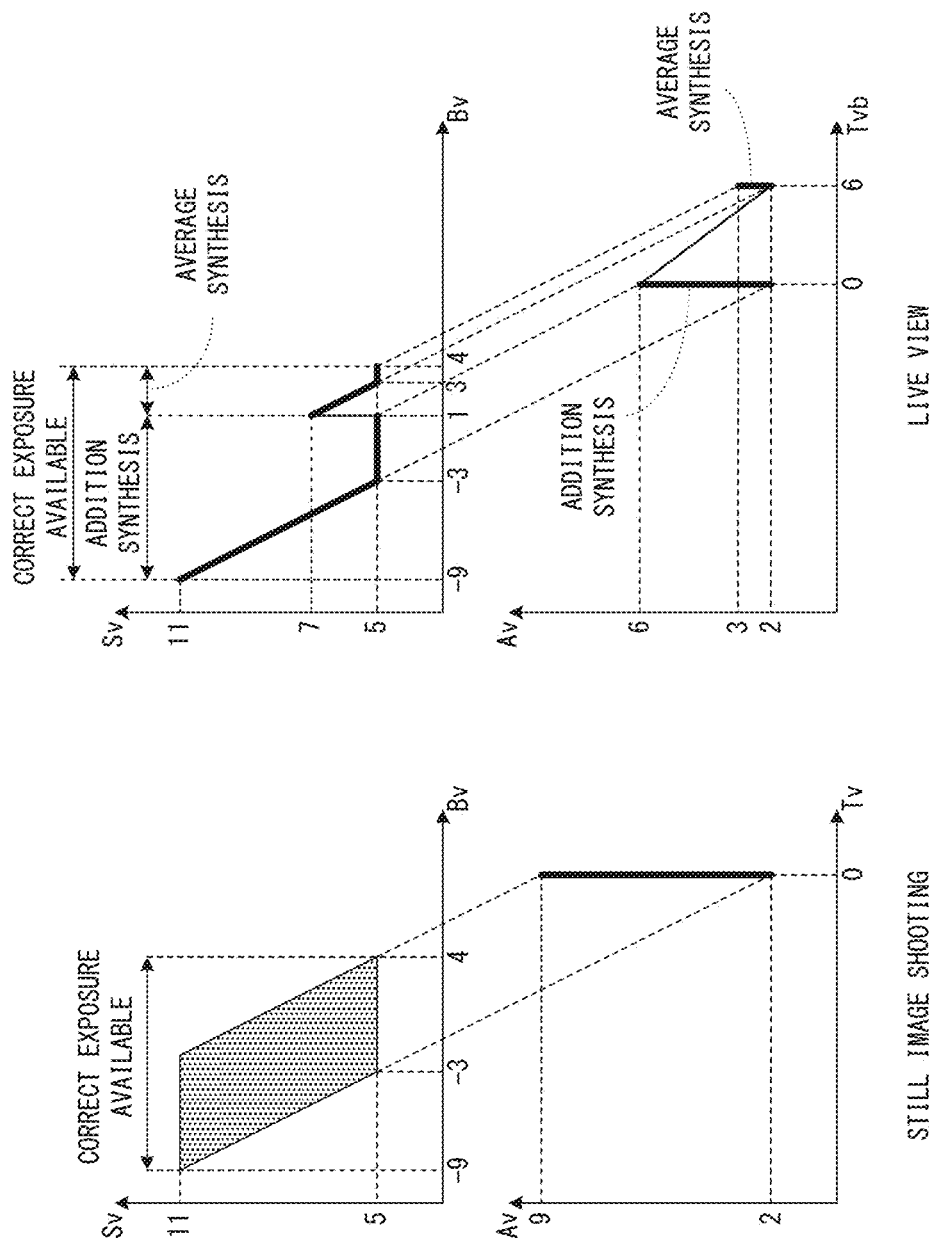
FIG. 7 illustrates an example of a program chart for still image shooting and a program chart for live view according to the first embodiment.

Next, using FIG. 7, an example of the synthesis processing method setting (S316) and the exposure setting (S317) is explained.

FIG. 7 illustrates an example of a program chart for still image shooting and a program chart for live view. Meanwhile, the program chart for still image shooting illustrated in FIG. 7 is the same as the program chart for the program chart for still image shooting presented in FIG. 26.

In this example, it is assumed that the frame rate for live view is 64 frames/second and 1 second is set as the shutter speed for shooting. Meanwhile, the frame rate 64 frames/second for live view corresponds to the shutter speed 1/64 seconds, Tv=6, and the shutter speed 1 second for the time of shooting corresponds to Tv=0.

In the case of this example, in the still image shooting, shooting with the correct exposure is possible in the range of Bv from −9 to 4, as presented in the shutter speed for shooting in FIG. 7. By contrast, in the long-time live view, when the addition synthesis process is set as the synthesis processing method and the generation of a synthesized image is performed, the live view image with the correct exposure may be obtained only in the range of Bv from −9 to 1, as presented in the program chart for live view in FIG. 7. Meanwhile, this is as already has been explained using FIG. 26.

Therefore, in the synthesis processing method setting (S316), as presented in the program chart for live view in FIG. 7, the following synthesis processing method is set according to the value of Bv corresponding to the detected subject luminance.

When the value of Bv is −9≤Bv≤1, the addition synthesis process is set.

When the value of Bv is 1<Bv≤4, the average synthesis process is set.

In the average synthesis process, as the movement of the subject, a slow shutter effect equivalent to Tv=0 may be obtained, and as the image brightness for one frame in the frame rate for live view, the brightness equivalent to Tv=6 is maintained, and therefore, an image with the correct exposure may be obtained in the range of Bv 1<Bv≤4 as well.

Meanwhile, in the addition synthesis process, the generation of the synthesized image is done by performing cumulative addition of pixel values for each of the corresponding pixels, and in the average synthesis process, the synthesized image is generated by calculating the average of pixel values for each of the corresponding pixels.

In the exposure setting (S317), as presented in the program chart for live view in FIG. 7, the following values of Sv and Av are determined according to the value of Bv, and exposure is set according to the value.

When the value of Bv is −9≤Bv≤−3, Sv=−Bv+2, Av=2 are determined.

When the value of Bv is −3<Bv≤1, Sv=5, Av=Bv+5 are determined.

When the value of Bv is 1<Bv≤3, Sv=−Bv+8, Av=2 are determined.

When the value of Bv is 3<Bv≤4, Sv=5, Av=Bv−1 are determined.

Next, using FIG. 8, an example of the synthesis processing method setting (S316) and the exposure setting (S317) in the case in which the shutter speed for shooting is changed is explained.

FIG. 8 illustrates another example of a program chart for still image shooting and a program chart for live view.

In this example, it is assumed that the shutter speed for shooting is changed from 1 second to 1/4 of a second. The shutter speed ¼ of a second for the time of shooting corresponds to Tv=2. In this example, the value of Tv shifts by two steps from 0 to 2, and therefore, the value of Bv for determining the synthesis processing method and exposure with respect to the program chart presented in FIG. 7 is also shifted, as presented in the program chart in FIG. 8.

Therefore, in the synthesis processing method setting (S316), as presented in the program chart for live view in FIG. 8, the following synthesis processing method is set according to the value of Bv corresponding to the detected subject luminance.

When the value of Bv is $-7 \leq Bv \leq 3$, the addition synthesis process is set.

When the value of Bv is $3 < Bv \leq 6$, the average synthesis process is set.

In the exposure setting (S317), as presented in the program chart for live view in FIG. 8, the following values of Sv and Av are determined according to the value of Bv, and exposure is set according to the value.

When the value of Bv is $-7 \leq Bv \leq 1$, $Sv = -Bv+4$, $Av=2$ are determined.

When the value of Bv is $-1 < Bv \leq 3$, $Sv=5$, $Av=Bv+3$ are determined.

When the value of Bv is $3 < Bv \leq 6$, $Sv=5$, $Av=Bv-1$ are determined.

While an example in which the addition synthesis process is set proactively as the synthesis processing method is presented in the synthesis processing method setting (S316) and in the exposure setting (S317) explained using FIG. 7 and FIG. 8, for example, when priority is given to the image quality of long-time live view, it is better to set the average synthesis process proactively. Here, using FIG. 9, an example of the synthesis processing method setting (S316) and the exposure setting (S317) is explained in a case in which the average synthesis process is proactively set.

Figure 9:
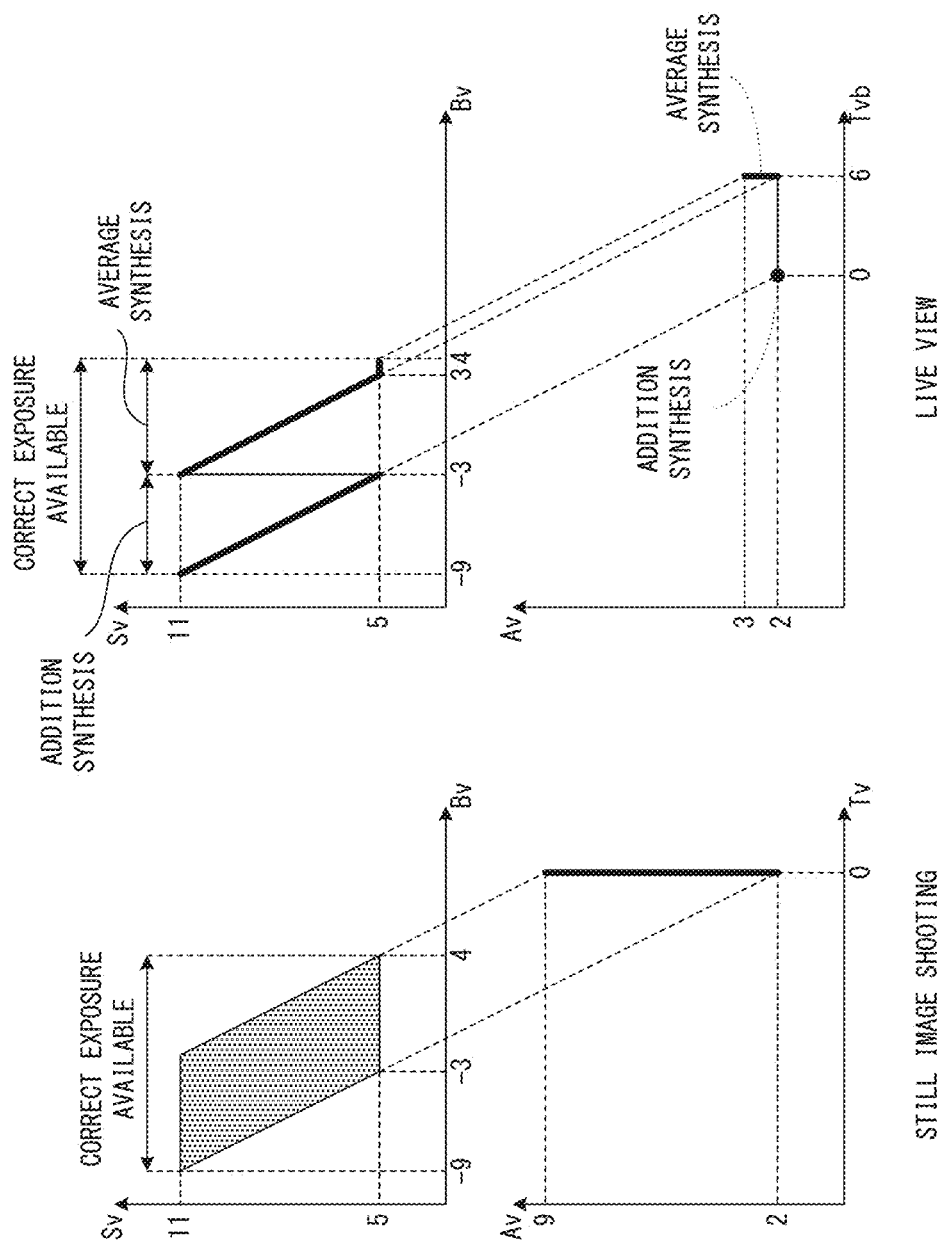
FIG. 9 illustrates another example a program chart for still image shooting and a program chart for live view according to the first embodiment.

FIG. 9 illustrates another example a program chart for still image shooting and a program chart for live view.

In this example, it is also assumed that the frame rate for live view is 64 frames/second, and 1 second is set as the shutter speed for shooting.

In the case of this example, in the synthesis processing method setting (S316), the following synthesis processing method is set according to the value of Bv corresponding to the detected subject luminance.

When the value of Bv is $-9 \leq Bv < -3$ the addition synthesis process is set.

When the value of Bv is $-3 \leq Bv \leq 4$ the average synthesis process is set.

In the exposure setting (S317), the following values of Sv and Av are determined according to the value of Bv, and exposure is set according to the value, as presented in the program chart for live view in FIG. 9.

When the value of Bv is $-9 \leq Bv < -3$ $Sv = -Bv+2$, $Av=2$ are determined.

When the value of Bv is $-3 v Bv < 3$, $Sv = -Bv+8$, $Av=2$ are determined.

When the value of Bv is $3 \leq Bv \leq 4$, $Sv=5$, $Av=Bv-1$ are determined.

Meanwhile, the program charts for live view used in the synthesis processing method setting (S316) and the exposure setting (S317) are not limited to the ones explained using FIG. 7, FIG. 8 and FIG. 9.

Figure 10:
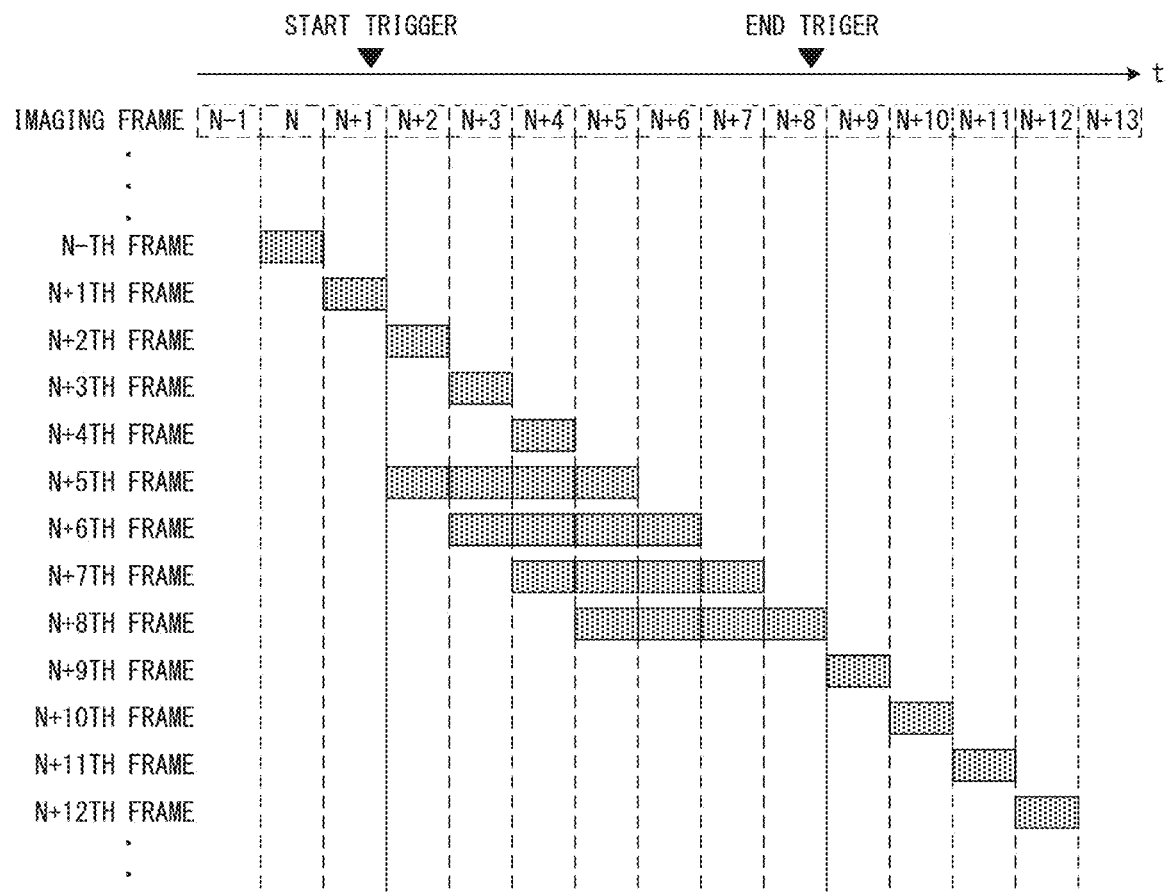
FIG. 10 is a schematic illustrating the relationship between an imaging frame and a synthesized frame at the time when a long-time live view function is set to on and at the time when the long-time live view function is set to off during the execution of the still image shooting standby operation process illustrated in FIG. 3.

FIG. 10 is a schematic illustrating the relationship between an imaging frame and a synthesized frame at the time when the long-time live view function is set to on and at the time when the long-time live view function is set to off during the execution of the still image shooting standby operation process illustrated in FIG. 3. Specifically, here, it is assumed that, during the execution of the still image shooting standby operation process, there are no changes in the number of images to be synthesized and the image synthesis process (S311) is repeatedly performed during the period from when the long-time live view function is set to on until when it is set to off. In addition, the number of images to be synthesized at this time is assumed as 4.

As illustrated in FIG. 10, during the period in which the long-time live view function is set to off, a normal live view operation is performed. The normal live view operation is the operation in the case in which the determination results in S303, S308 and S315 are NO. Then, when the long-time live view function is set to on, after the "start trigger" that represents this point in time, as soon as the four imaging frame images corresponding to the number of images to be synthesized are ready, the generation and display of the display frame image are performed using the four imaging frame images. Here, the four imaging frame images are four imaging frame images exposed in the synthesized frame of the N+2th frame through N+5th frame. Meanwhile, during the period from when the long-time live view function is set to on before the four shooting frames are ready, the same operation as the normal live view operation is performed. After that, during the period in which the long-time live view function is set to on, in a similar manner as illustrated in FIG. 5, update of the display frame image is performed while shifting the frames to be synthesized. Then, when the long-time live view function is set to off, after the "end trigger" that represents this point in time, the operation quickly returns to the normal live view operation.

Figure 11:
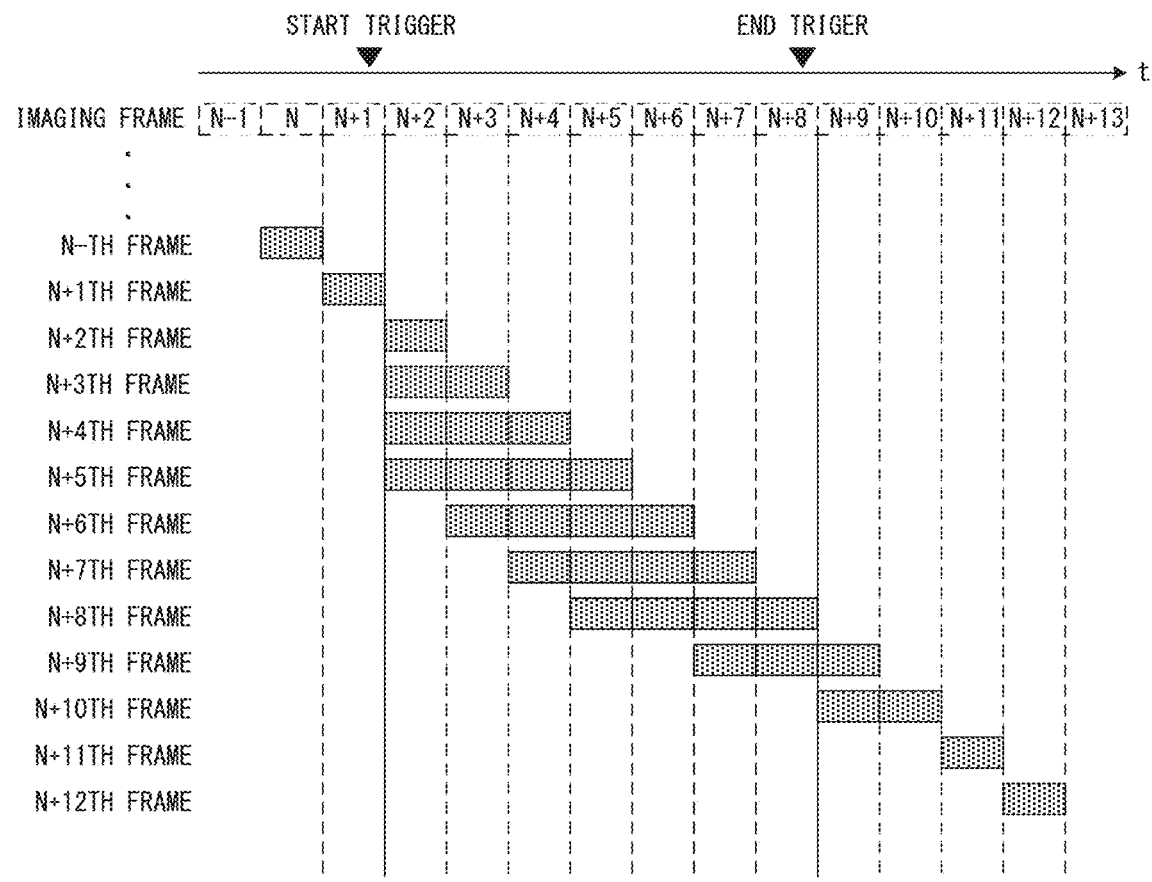
FIG. 11 is a schematic for a variation of the operation at the time when the long-time live view function is set to on and the operation at the time when the long-time live view function is set to off in the schematic illustrated in FIG. 10.

FIG. 11 is a schematic for a variation of the operation at the time when the long-time live view function is set to on and the operation at the time when the long-time live view function is set to off in the schematic illustrated in FIG. 10.

As illustrated in FIG. 11, during the period from when the long-time live view function is set to on before the imaging frame images corresponding to the number of images to be synthesizes are ready, the generation of the display frame image that is to be the synthesized image may also be performed while increasing the number of imaging frame images to be synthesized by one for each frame. In addition, when the long-time live view function is set to off, the generation of the display frame image that is to be the synthesized image may also be performed while decreasing the number of imaging frame images to be synthesized by one for each frame.

Alternatively, the operation illustrated in the schematic in FIG. 10 and the operation illustrated in the schematic in FIG. 11 may be combined.

Figure 12:
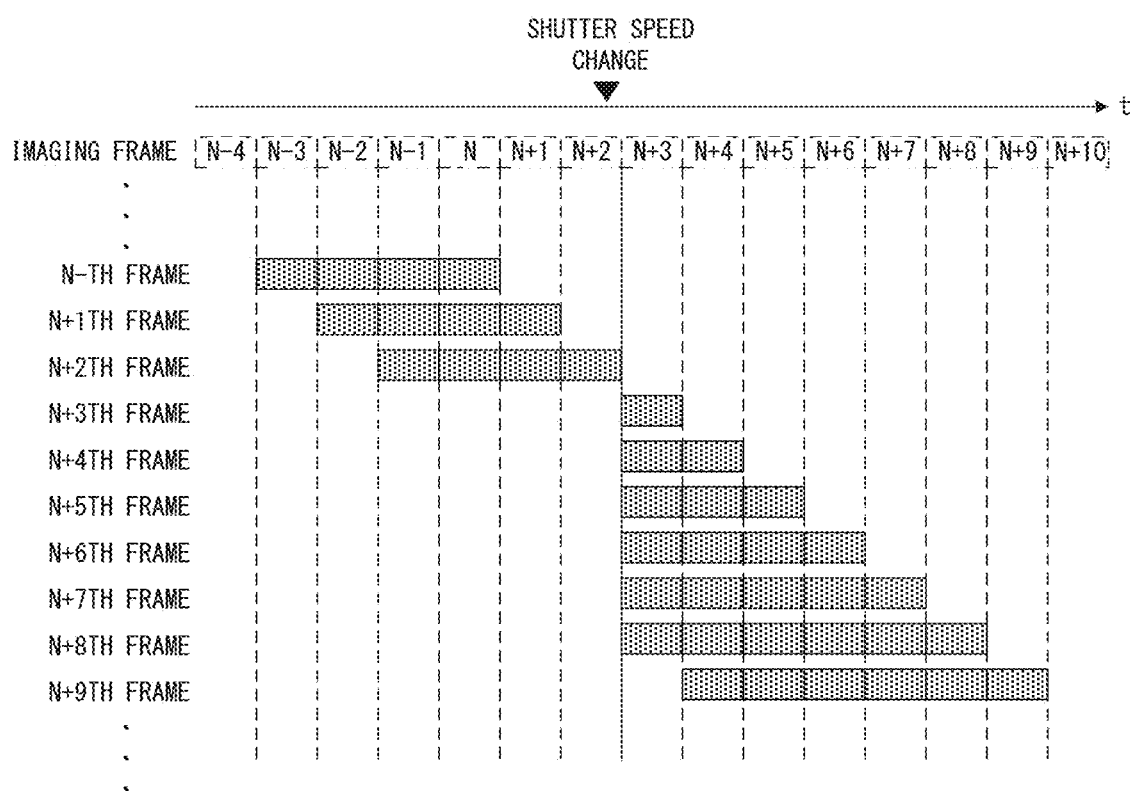
FIG. 12 is a schematic illustrating the relationship between an imaging frame and a synthesized frame at the time when the shutter speed for shooting is changed to a lower speed during the execution of the still image shooting standby operation process illustrated in FIG. 3.

FIG. 12 is a schematic illustrating the relationship between an imaging frame and a synthesized frame at the time when the shooting shutter speed is changed to a lower speed during the execution of the still image shooting standby operation process illustrated in FIG. 3. Specifically, here, it is assumed that, during the execution of the still image shooting standby operation process, the image synthesis process (S311) is repeatedly performed. In addition, it is assumed that, along with the change of the shutter speed for shooting to a lower speed, the number of images to be synthesized is changed from four to six.

As illustrated in FIG. 12, in this case, during the period from when the SDRAM 310 is cleared at the point in time when the shutter speed for shooting is changed, before the six imaging frame images corresponding to the number of images to be synthesized after change are ready after that, the generation and display of the display frame image that is to be the synthesized image are performed while increasing the number of imaging frame images to be synthesized by one, for each frame. After that, during the period in which the long-time live view function is set to on, in a similar manner to that illustrated in FIG. 5, update of the display frame image is performed while shifting the frames to be synthesized.

Meanwhile, while it is not illustrated in the drawings, without clearing the SDRAM 310 at the point in time when the shutter speed for shooting is changed, and after that, before the six imaging frame images corresponding to the number of images to be synthesized after change are ready, the generation and display of the display frame image that is to be the synthesized image may be performed while increasing the number of imaging frame images to be synthesized by one, for each frame.

In addition, while it is not illustrated in the drawings, when the shutter speed for shooting is changed to a higher speed, and along with that, a change is made in the direction in which the number of images to be synthesized decreases, from the point in time when the shutter speed for shooting is changed, the generation and display of the display frame image that is to be the synthesized image are performed while decreasing the number of imaging frame images to be synthesized by one, for each frame until it becomes the number of images to be synthesized after change.

As described above, according to the first embodiment, even in a case in which the set shutter speed for shooting is a low speed, when the long-time live view function is set to on, effects according to this shutter speed for shooting may be checked in the live view, and it is also possible to display a live view image at an appropriate brightness.

Meanwhile, in the present embodiment, during the live view operation, the reading out of image signals are performed continuously, and therefore, an electronic shutter is used. The electronic shutter is realized by the electronic shutter function of the image pickup device 306 and controlled by the image pickup device I/F circuit 307, under the control of the BCPU 327.

In addition, in the present embodiment, when the non-exposure time in each frame during the live view operation is long, the synthesized image generated by the image synthesis process (S307) may become an awkward image in the moving body region. Therefore, in order to prevent the exposure time from becoming discontinuous in each frame of the plurality of frames in which the plurality of buffering images used for the generation of the synthesized images are obtained, the shutter speed for shooting during the live view operation is set as 1/(the frame rate for live view) as described earlier, or as a value as close as possible to it. For example, when the frame rate for live view is 120 frames/second, the shutter speed for imaging during the live view operation is set as 1/120 of a second.

In addition, in the present embodiment, when the set shutter speed for shooting is a high speed such as 1/(the frame rate for live view) or higher for example, in order to faithfully reproduce the shutter speed for shooting, the shutter speed for imaging may be matched with the shutter speed for shooting. Alternatively, when the shutter speed for shooting is a high speed, there is little difference in appearance in the live view display according to shutter speed for shooting, and therefore, in consideration of easiness in the viewing of the live view display, the shutter speed for imaging may be controlled in a similar manner as for the normal live view operation.

Second Embodiment

Next, the second embodiment is explained. In this explanation, only the points that are different from the first embodiment are explained. In addition, the same numerals are assigned to the same components as in the first embodiment, and explanation for them are omitted.

In the synthesis processing method setting (S316) and the exposure setting (S317) explained in the first embodiment, the values of Sv and Av jump at certain luminance in some cases. In consideration of the appearance of the live view display and the AF performance, it is preferable to make the values of Sv and Av change continuously. Therefore, in the second embodiment, it is made possible by further making the added-by-weight synthesis process available to be set as the synthesis processing method.

The processes of the addition synthesis, the average synthesis, and the added-by-weight synthesis may be defined according to the expressions below.

Addition synthesis: $S=I_1+I_2+I_3+\ldots+I_N$

Average synthesis: $S=I_1/N+I_2/N+I_3/N+\ldots+I_N/N$

Added-by-weight synthesis: $S=WI_1+WI_2+WI_3+\ldots+WI_N$

Here, $I_K$ is the pixel value of the K-th image, S is the pixel value of the synthesized image, N is the number of frames to be synthesized, and W is weight.

Figure 13:
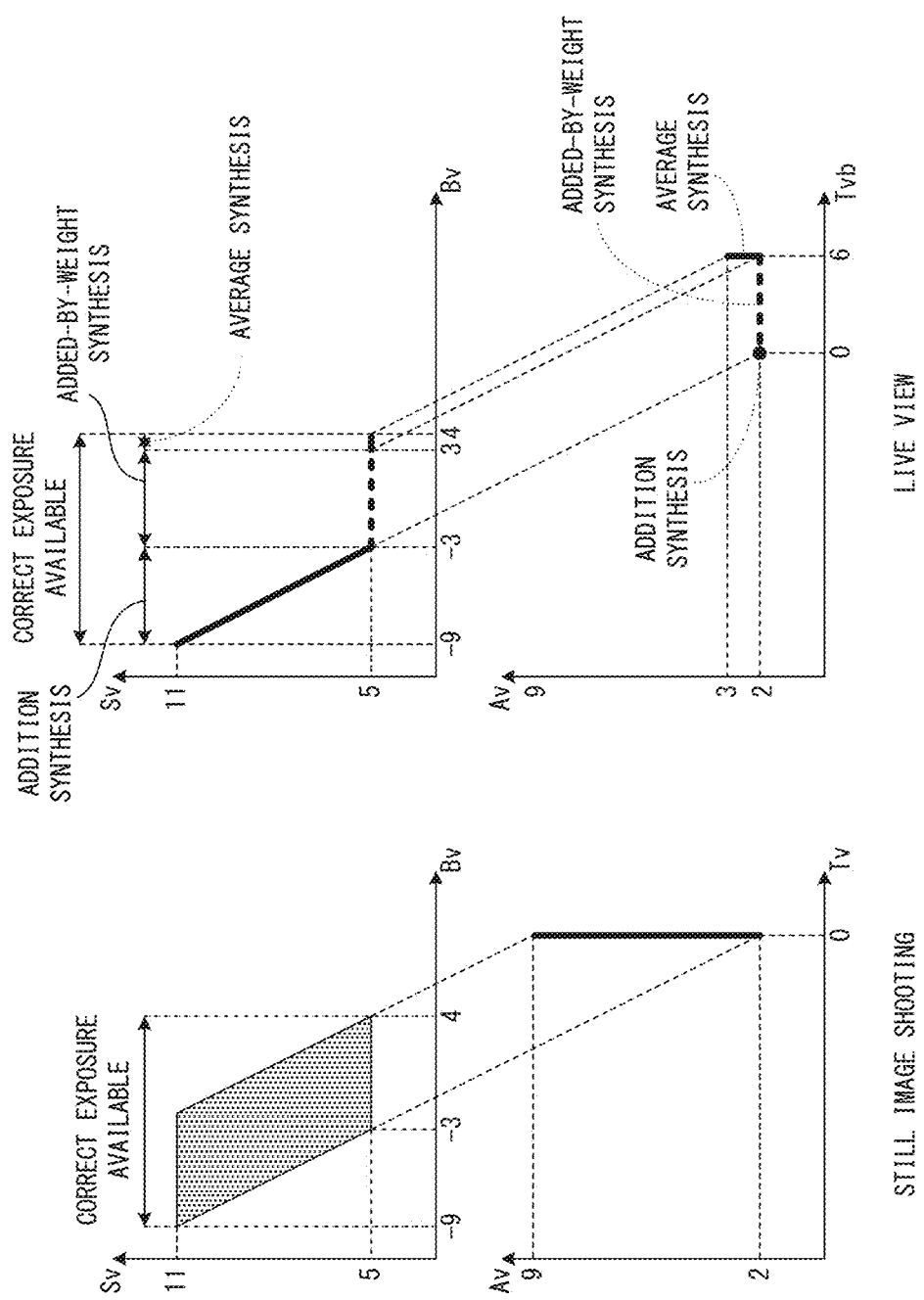
FIG. 13 illustrates an example of a program chart for still image shooting and a program chart for live view according to the second embodiment.
Figure 14:
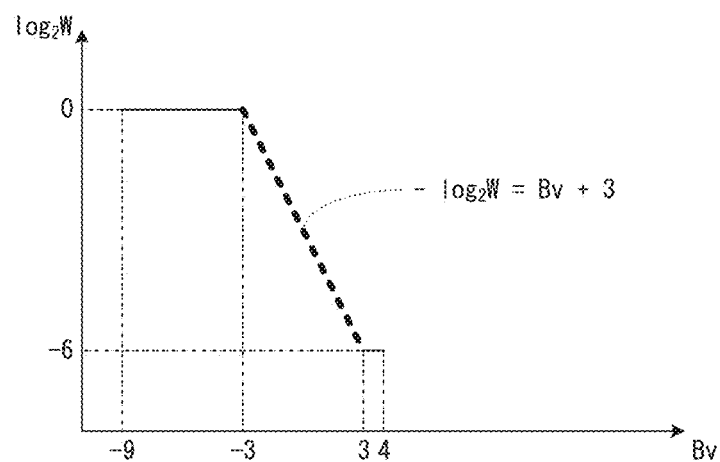
FIG. 14 illustrates an example of the relationship between weight W and Bv used in an added-by-weight synthesis process according to the second embodiment.

Using FIG. 13 and FIG. 14, an example of the synthesis processing method setting (S316) and the exposure setting (S317) according to the second embodiment is explained.

FIG. 13 illustrates an example of a program chart for still image shooting and a program chart for live view according to the second embodiment. FIG. 14 illustrates an example of the relationship between weight W and Bv used in an added-by-weight synthesis process according to the second embodiment.

In this example, in a similar manner as in the example explained using FIG. 7, it is assumed that the frame rate for live view is 64 frames/second and 1 second is set as the shutter speed for shooting.

In this example, in the synthesis processing method setting (S316) according to the second embodiment, as presented in the program chart for live view in FIG. 13, the following synthesis processing method is set according to the value of Bv corresponding to the detected subject luminance.

When the value of Bv is $-9 \leq Bv - 3$ the addition synthesis process is set.

When the value of Bv is $-3<Bv<3$, the added-by-weight synthesis process is set. Here, the weight W at this time is set as a value that satisfies relational expression $-\log_2 W = Bv+3$, as presented in FIG. 14. Meanwhile, this relational expression is associated with the program chart for live view presented in FIG. 13 and stored in the flash ROM 311, for example.

When the value of Bv is $3 \leq Bv \leq 4$ the average synthesis process is set.

In the exposure setting (S317) according to the second embodiment, as presented in the program chart for live view in FIG. 13, the following values of Sv and Av are determined according to the value of BV corresponding to the detected subject luminance.

When the value of BV is $-9 \leq Bv - 3$ $Sv=-Bv+2$, $Av=2$ are determined.

When the value of BV is $-3<Bv<3$, $Sv=5$, $Av=2$ are determined.

When the value of BV is $3 \leq Bv \leq 4$, $Sv=5$, $Av=Bv-1$ are determined.

In the added-by-weight synthesis process, in a similar manner as in the average synthesis process, a slow shutter effect equivalent to $Tv=0$ may be obtained as the movement of the subject. In addition, the brightness of the image for one frame in the frame rate for live view changes according to the weight W, and therefore, it becomes possible to obtain an image with the correct exposure while maintaining the values of Sv and Av in the range of Bv from −3 to 3 as well.

As described above, according to the second embodiment, a similar effect to that in the first embodiment may be obtained, and also, since the values of Sv and Av do not jump according to the value of Bv, the appearance of the live view display and the AF performance will not be affected negatively.

Meanwhile, in the second embodiment, a configuration is also possible in which, regardless of the shutter speed and aperture for time of still image shooting, the live view image of an appropriate brightness is constantly displayed, for example. This is explained using FIG. 15 and FIG. 16.

Figure 15:
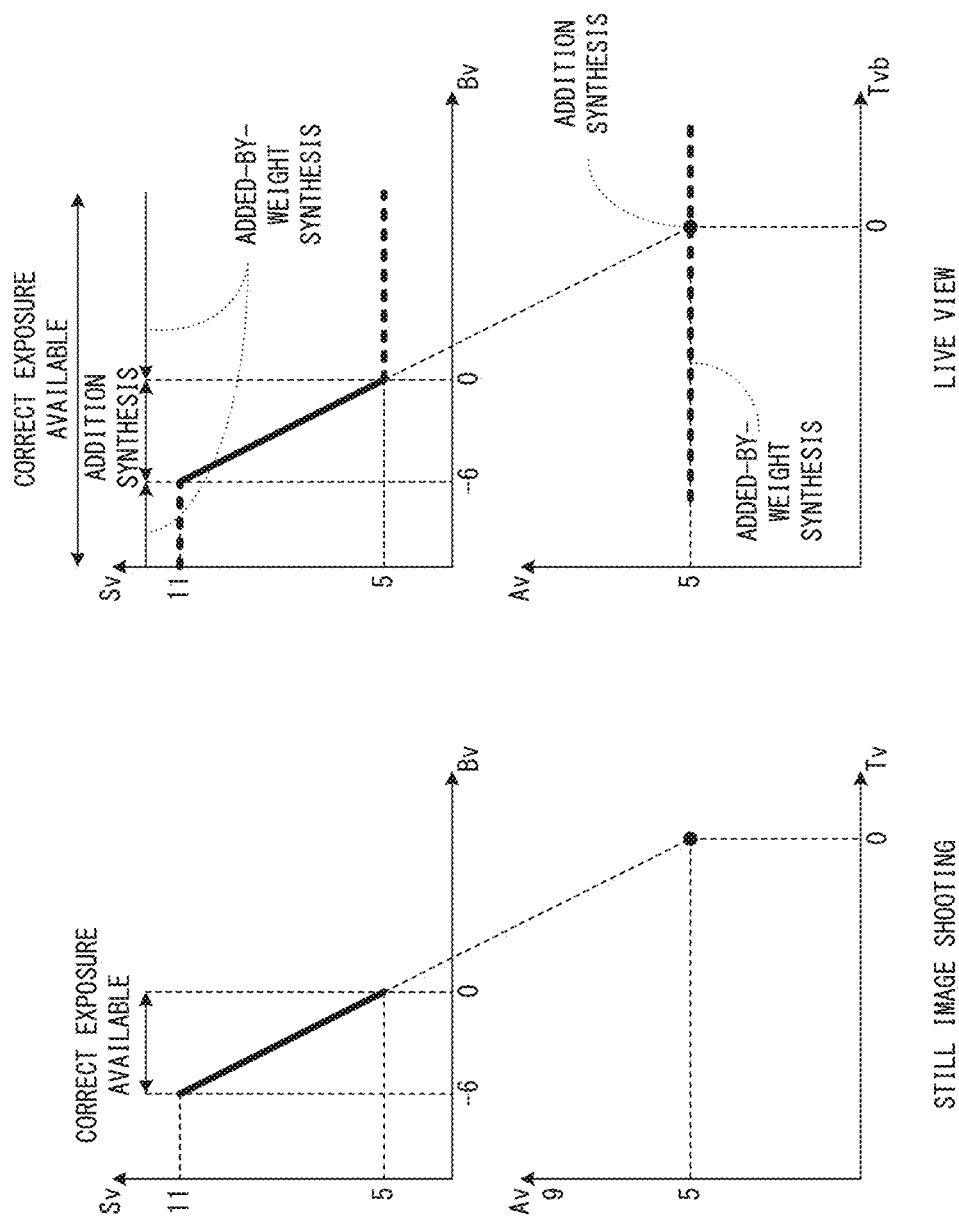
FIG. 15 illustrates an example of a program chart for still image shooting and a program chart for live view according to a variation example of the second embodiment.
Figure 16:
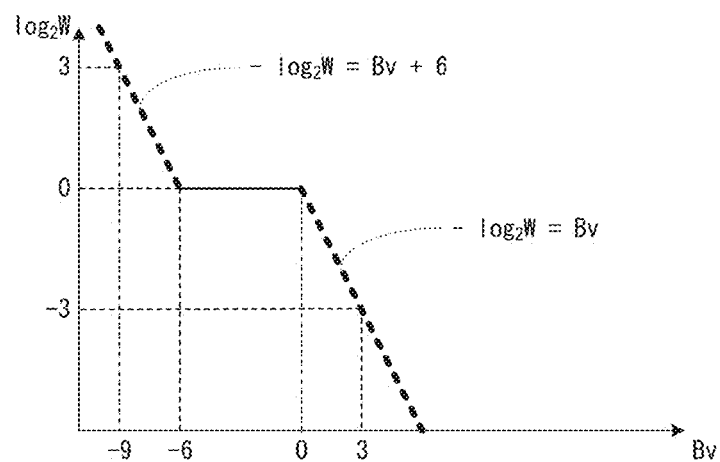
FIG. 16 illustrates an example of the relationship between weight W and Bv used in an added-by-weight synthesis process according to a variation example of the second embodiment.

FIG. 15 illustrates an example of a program chart for still image shooting and a program chart for live view according to a variation example of the second embodiment. FIG. 16 illustrates an example of the relationship between weight W and Bv used in the added-by-weight synthesis process according to a variation example of the second embodiment.

In the example explained here, the shutter speed and the aperture for the time of still image shooting are assumed as the shutter speed corresponding to Tv=0 and the aperture corresponding to Av=5.

In this example, in the synthesis processing method setting (S316) according to the variation example of the second embodiment, as presented in the program chart for live view in FIG. 15, the following synthesis processing method is set according to the value of Bv corresponding to the detected subject luminance.

When the value of Bv is Bv<−6, the added-by-weight synthesis process is set. Meanwhile, the weight W is set as a value that satisfies relational expression $-\log_2 W = Bv+6$, as presented in FIG. 16.

When the value of Bv is −6≤Bv≤0, the addition synthesis process is set.

When the value of Bv is 0<Bv, the added-by-weight synthesis process is set. Meanwhile, the weight W is set as a value that satisfies relational expression $-\log_2 W = Bv$, as presented in FIG. 16.

Meanwhile, the relational expression presented in FIG. 16 is associated with the program chart for live view presented in FIG. 15 and stored in the flash ROM 311, for example.

In the exposure setting (S317) according to the variation example of the second embodiment, as presented in the program chart for live view in FIG. 15, the following values of Sv and Av are set according to the value of Bv corresponding to the detected subject luminance.

When the value of Bv is Bv<−6, Sv=11, Av=5 are set.
When the value of Bv is −6≤Bv≤0, Sv=−Bv+5, Av=5 are set.
When the value of Bv is 0<Bv, Sv=5, Av=5 are set.

According to this variation example, the correct exposure may be obtained only in the range of 6≤Bv≤0 in still image shooting, but in the live view, the correct exposure may be obtained in the entire range of Bv. In addition, it is possible to perform live view display of an image in which not only the shutter speed for shooting but also the depth of field is also equivalent to that in the still image shooting.

In addition, in the second embodiment, when there are temporal changes in the subject luminance during the live view operation, the synthesis processing method used for the image synthesis process (S311) may be switched every time this change occurs, and the live view display may become unstable. Therefore, in the image synthesis process (S311), as described below, a process that is suitable for stabilizing the live view display may be performed.

Figure 17:
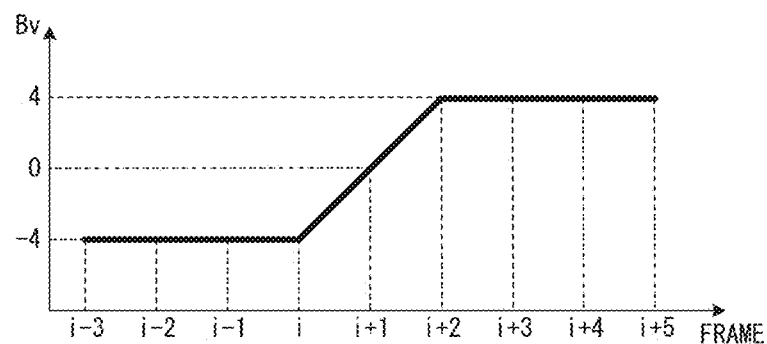
FIG. 17 illustrates an example of the change by each frame of the value of Bv corresponding to the subject luminance detected in S314.

FIG. 17 illustrates an example of the change by each frame of the value of Bv corresponding to the subject luminance detected in S314. Here, the frame is a frame in the frame rate for live view.

As illustrated in FIG. 17, in this example, Bv=−4 before the i-th frame, Bv=0 at the i+1th frame, and Bv=4 after i+2th frame.

In this case, assuming that the synthesis processing method setting (S316) and the exposure setting (S317) are performed according to the program chart for live view presented in FIG. 13 and the relationship between the weight W and Bv illustrated in FIG. 14, imaging and the image synthesis process (S311) are performed as follows.

Up to i-th frame, according to Bv=−4, imaging is performed with the sensitivity corresponding to Sv=6 and the aperture corresponding to Av=2, and an addition synthesis of 64 pieces of buffering images is performed. This is expressed by expression $S_i = I_{i-63} + I_{i-62} + \ldots + I_{i-1} + I_i$.

At the i+1th frame, according to Bv=0, imaging is performed with the sensitivity corresponding to Sv=5 and the aperture corresponding to Av=2, and an added-by-weight synthesis is performed with only the buffering image of the i+1th frame with a ⅛ weight. This is expressed by expression $S_{i+1} = I_{i-62} + I_{i-61} + \ldots + I_i + (⅛)I_{i+1}$.

At the i+2th frame, according to Bv=4, imaging is performed with the sensitivity corresponding to Sv=5 and the aperture corresponding to Av=3, and an average synthesis is performed only for the buffering image of the i+2th frame. This is expressed by expression $S_{i+2} = I_{i-61} + I_{i-60} + \ldots + (⅛)I_{i+1} + I_{i+2}/64$.

At the i+3th frame, according to Bv=4, imaging is performed with the sensitivity corresponding to Sv=5 and the aperture corresponding to Av=3, and an average synthesis is performed only for the buffering images of the i+2th frame and the i+3th frame. This is expressed by expression $S_{i+3} = jI_{i-60} + I_{i-59} + \ldots + (⅛)I_{i+1} + I_{i+2}/64 + I_{i+3}/64$.

After that, the similar processes are repeated up to the i+64th frame.

After the i+65th frame, according to Bv=4, imaging is performed with the sensitivity corresponding to Sv=5 and the aperture corresponding to Av=3, and an average synthesis of 64 pieces of buffering images is performed ($S_{i+65} = I_{i+2}/64 + I_{i+3}/64 + \ldots + I_{i+64}/64 + I_{i+65}/64$).

According to this process, the live view display may be stabilized.

Third Embodiment

Next, the third embodiment is explained. In this explanation, only the points that are different from the first embodiment are explained. In addition, the same numerals are assigned to the same components as in the first embodiment, and explanation for them are omitted.

Figure 18:
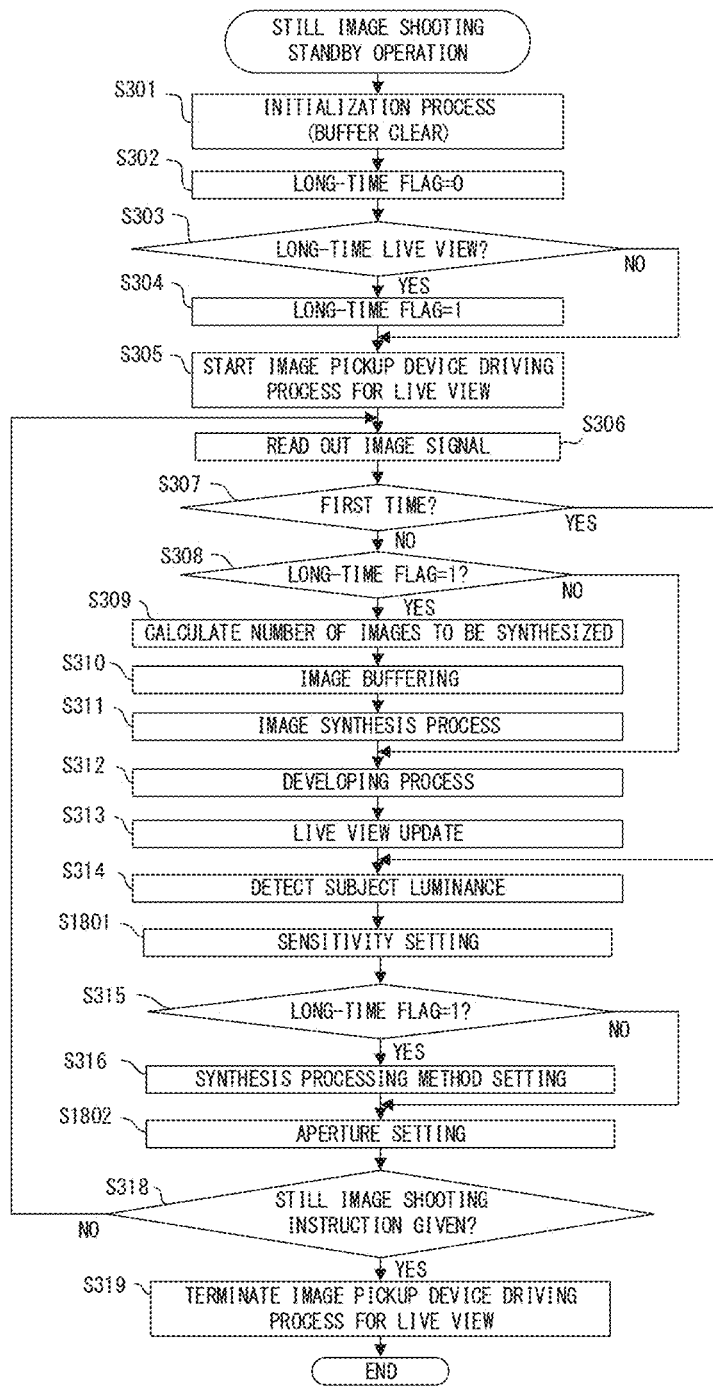
FIG. 18 is a flowchart illustrating the flow of the still image shooting standby operation process (S204) according to the third embodiment.

FIG. 18 is a flowchart illustrating the flow of the still image shooting standby operation process (S204) according to the third embodiment.

As illustrated in FIG. 18, the still image shooting standby operation process according to the third embodiment differs from the still image shooting standby operation process according to the first embodiment illustrated in FIG. 3 in that a sensitivity setting (S1801) is performed after S314 and before S315, and also that an aperture setting (S1802) is performed instead of S317.

In the sensitivity setting (S1801), the BCPU 327 determines the value of Sv according to the program chart for live view corresponding to the set shutter speed for shooting and the value of Bv corresponding to the subject luminance detected in S314, and the sensitivity corresponding to this value of Sv is set.

In the aperture setting (S1802), the BCPU 327 determines the value of Av according to the program chart for live view corresponding to the set shutter speed for shooting and the value of Sv determined in S1801, and the aperture corresponding to this value of Av is set.

In addition, in the still image shooting standby operation process according to the third embodiment illustrated in FIG. 18, in the synthesis processing method setting (S316), the synthesis processing method is determined according to the program chart for live view corresponding to the set shutter speed for shooting and the value of Sv determined in S1801.

Other matters are similar to those in the still image shooting standby operation process according to the first embodiment.

Figure 19:
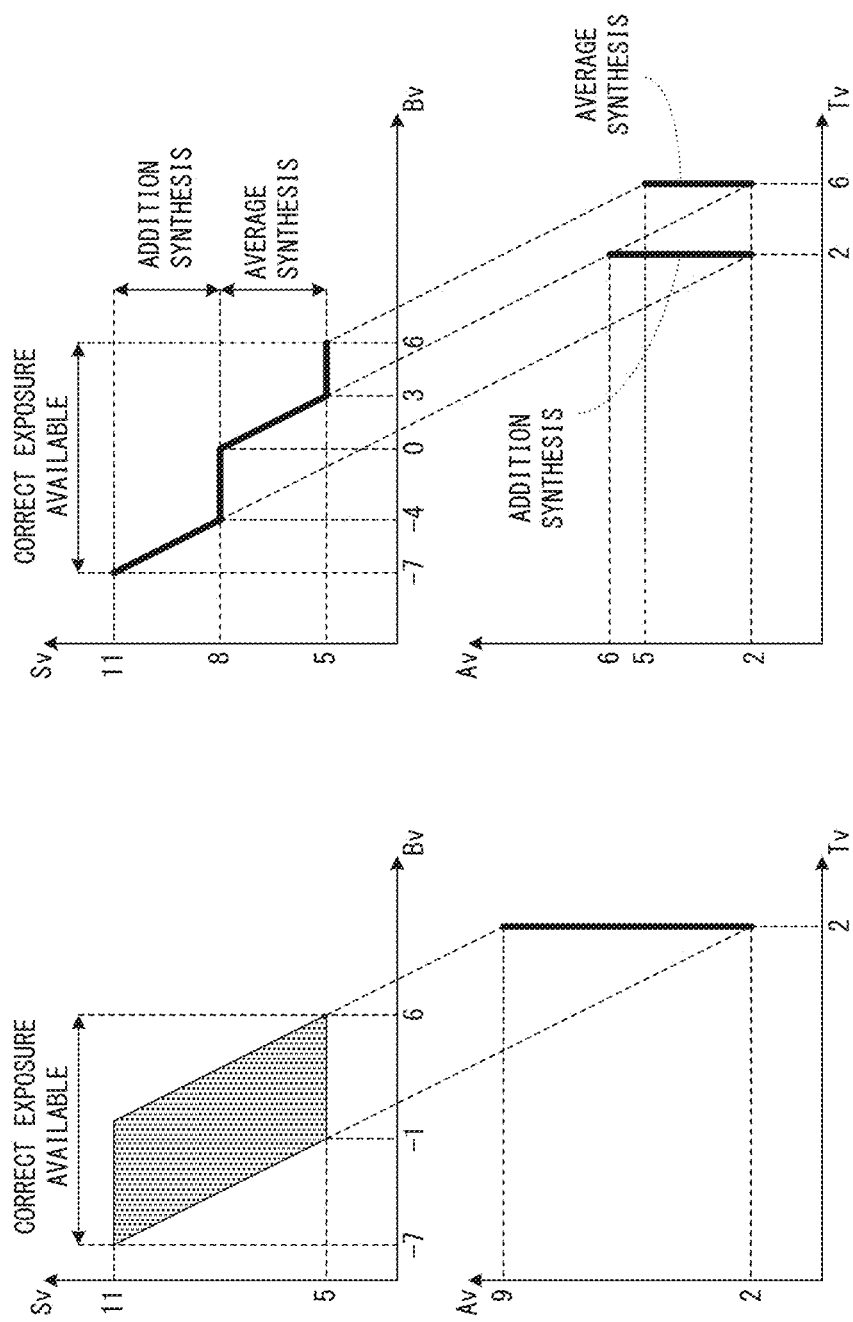
FIG. 19 illustrates an example of a program chart for still image shooting and a program chart for live view according to the third embodiment.

Next, using FIG. 19, an example of the sensitivity setting (S1801), the synthesis processing method setting (S316), and the aperture setting (S1802) according to the third embodiment is explained.

FIG. 19 illustrates an example of a program chart for still image shooting and a program chart for live view according to the third embodiment.

In this example, it is assumed that the frame rate for live view is 64 frames/second, and ¼ of a second is set as the shutter speed for shooting.

In this example, in the sensitivity setting (S1801), as presented in the program chart for live view in FIG. 19, the following values of Sv are determined according to the value of BV corresponding to the detected subject luminance.

When the value of Bv is $-7 \leq Bv < -4$, $Sv = -Bv+4$ is set.
When the value of Bv is $-4 \leq Bv \leq 0$, $Sv = 8$ is set.
When the value of Bv is $0 < Bv < 3$, $Sv = -Bv+8$ is set.
When the value of Bv is $3 \leq Bv \leq 6$, $Sv = 5$ is set.

In the synthesis processing method setting (S316) according to the third embodiment, as presented in the program chart for live view in FIG. 19, the following synthesis processing method is set according to the value of Sv determined in S1801.

When the value of Sv is $5 \leq Sv < 8$, the average synthesis process is set.
When the value of Sv is $8 \leq Sv \leq 11$, the addition synthesis process is set.

In the aperture setting (S1802), as presented in the program chart for live view in FIG. 19, the following values of Av are determined according to the value of Sv determined in S1801.

When the value of Sv is $5 \leq Sv < 8$, $Av = Bv + Sv - 6$ is determined.
When the value of Sv is $8 \leq Sv \leq 11$, $Av = Bv + Sv - 2$ is determined.

As described above, according to the third embodiment, effects that are similar to those according to the first embodiment may be obtained as well.

Fourth Embodiment

Next, the fourth embodiment is explained. In this explanation, only the points that are different from the first embodiment are explained. In addition, the same numerals are assigned to the same components as in the first embodiment, and explanation for them are omitted.

Figure 20:
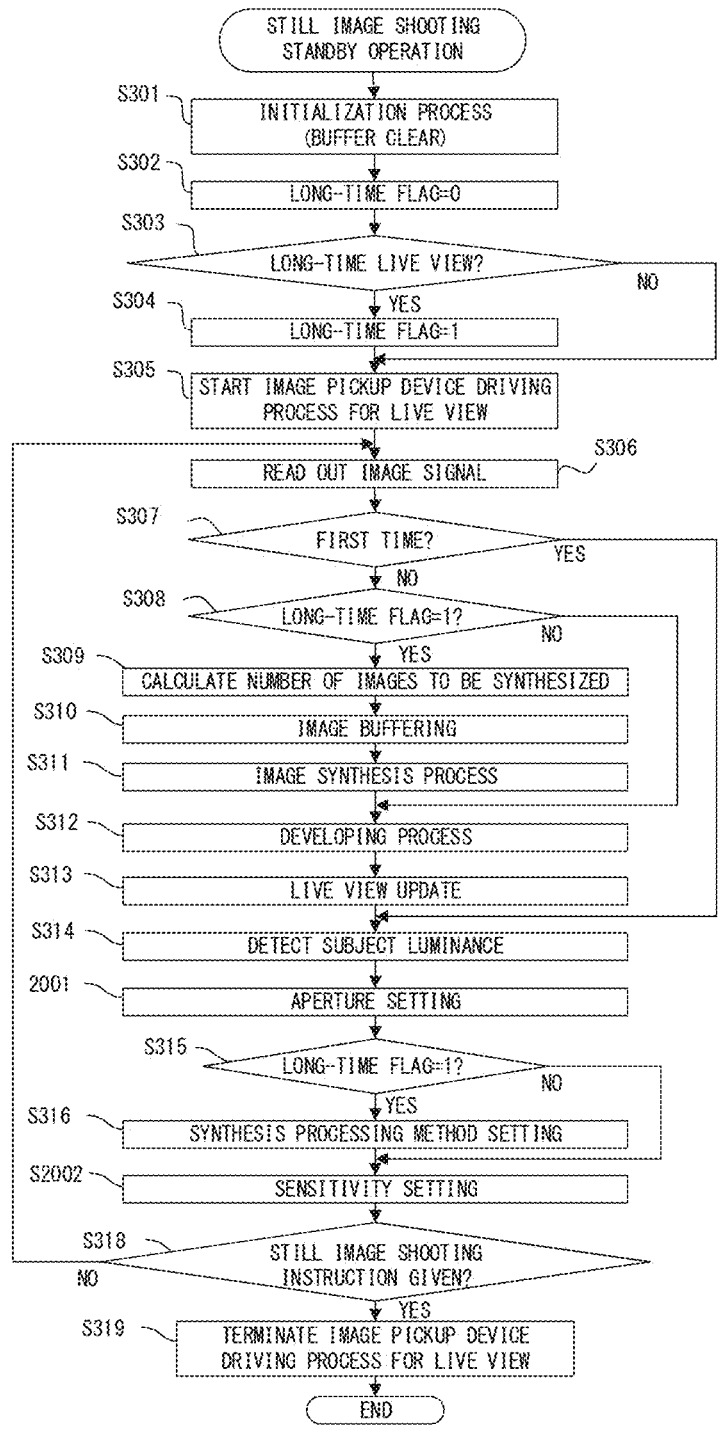
FIG. 20 is a flowchart illustrating the flow of the still image shooting standby operation process (S204) according to the fourth embodiment.

FIG. 20 is a flowchart illustrating the flow of the still image shooting standby operation process (S204) according to the fourth embodiment.

As illustrated in FIG. 20, the still image shooting standby operation process according to the fourth embodiment differs from the still image shooting standby operation process according to the first embodiment illustrated in FIG. 3 in that an aperture setting (S2001) is performed after S314 and before S315, and also a sensitivity setting (S2002) is performed instead of S317.

In the aperture setting (S2001), the BCPU 327 determines the value of Av according to the program chart for live view corresponding to the set shutter speed for shooting and the value of Bv corresponding to the subject luminance detected in S314, and the aperture corresponding to this value of Av is set.

In the sensitivity setting (S2002), the BCPU 327 determines the value of Sv according to the program chart for live view corresponding to the set shutter speed for shooting and the value of Av determined in S2001, and the sensitivity according to the value of this Sv is set.

In addition, in the still image shooting standby operation process according to the fourth embodiment illustrated in FIG. 20, in the synthesis processing method setting (S316), the synthesis processing method is determined according to the program chart for live view corresponding to the set shutter speed for shooting and the value of Av determined in S2001.

Other matters are similar to those in the still image shooting standby operation process according to the first embodiment.

Figure 21:
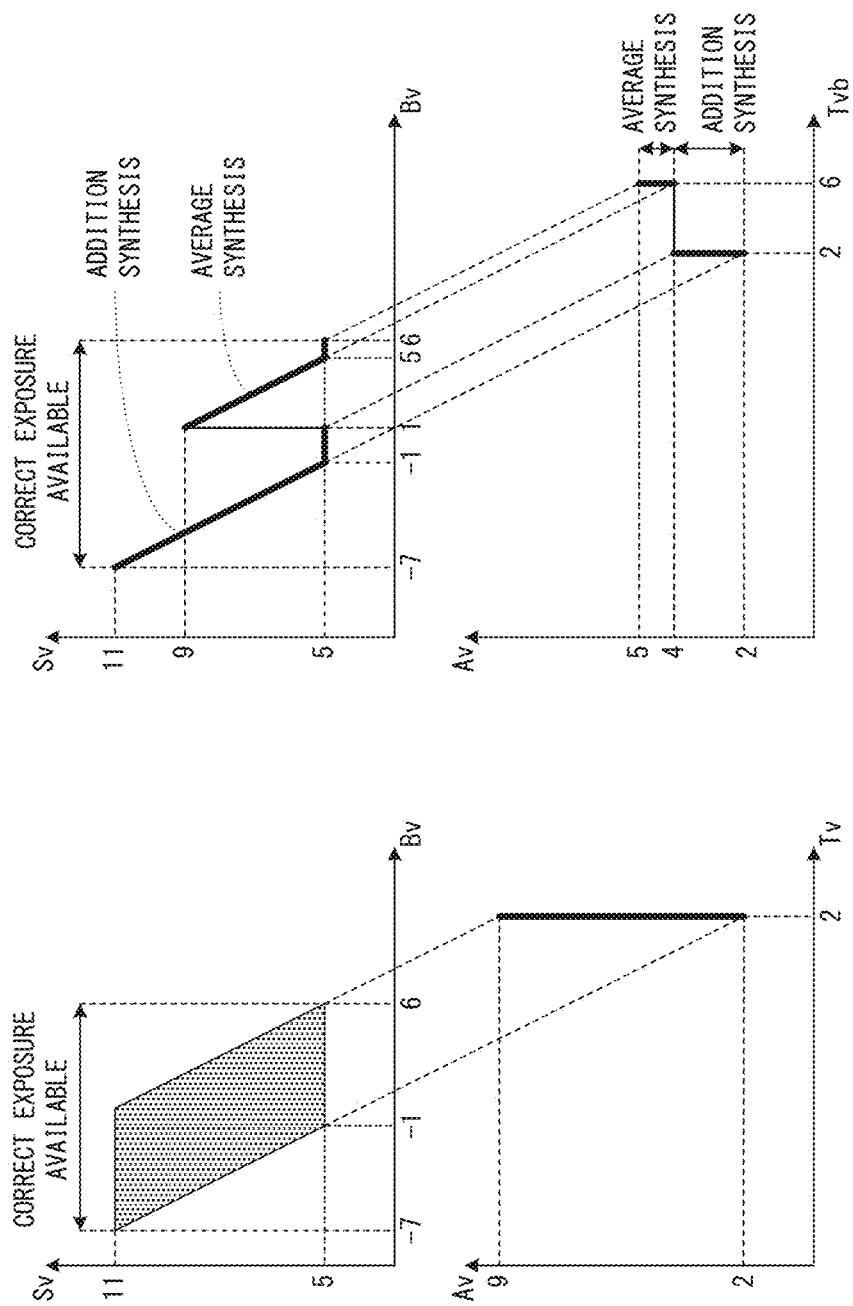
FIG. 21 illustrates an example of a program chart for still image shooting and a program chart for live view according to the fourth embodiment.

Next, using FIG. 21, an example of the aperture setting (S2001), the synthesis processing method setting (S316), and the sensitivity setting (S2002) is explained.

FIG. 21 illustrates an example of a program chart for still image shooting and a program chart for live view according to the fourth embodiment.

In this example, in the same manner as in the third embodiment, it is assumed that frame rate for live view is 64 frames/second, and ¼ of a second is set as the shutter speed for shooting.

In this example, in the aperture setting (S2001), as presented in the program chart for live view in FIG. 21, the following values of Av are set according to the value of BV corresponding to the detected subject luminance.

When the value of Bv is $-7 \leq Bv - 1$, $Av = 2$ is set.
When the value of Bv is $-1 < Bv < 1$, $Av = Bv + 3$ is set.
When the value of Bv is $1 \leq Bv \leq 5$, $Av = 4$ is set.
When the value of Bv is $5 < Bv \leq 6$, $Av = Bv - 1$ is set.

In the synthesis processing method setting (S316) according to the fourth embodiment, as presented in the program chart for live view in FIG. 21, the following synthesis processing method is determined according to the value of Av determined in S2001.

When the value of Av is $2 \leq Av \leq 4$, the addition synthesis process is set.
When the value of Av is $4 < Av \leq 5$, the average synthesis process is set.

In the sensitivity setting (S2002), as presented in the program chart for live view in FIG. 21, the following value of Sv are determined according to the value of Av determined in S2001.

When the value of Av is $2 \leq Av \leq 4$, $Sv = Av - Bv + 2$ is determined.
When the value of Av is $4 < Av \leq 5$, $Sv = Av - Bv + 6$ is determined.

As described above, according to the fourth embodiment, effects that are similar to those according to the first embodiment may be obtained as well.

Fifth Embodiment

Next, the fifth embodiment is explained. In this explanation, only the points that are different from the first embodiment are explained. In addition, the same numerals are assigned to the same components as in the first embodiment, and explanation for them are omitted.

In the fifth embodiment, the image processing controller 308 further has a function for synthesizing captured still images.

Figure 22:
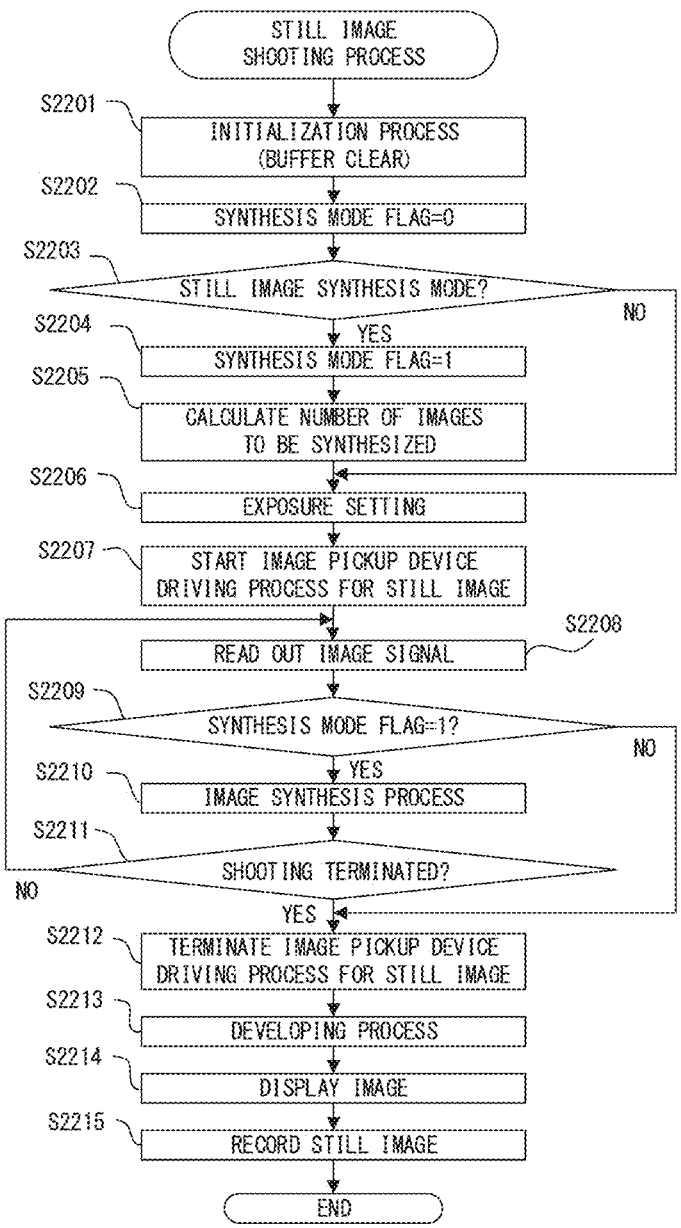
FIG. 22 is a flowchart illustrating the flow of a still image shooting operation process (S205) according to the fifth embodiment.

FIG. 22 is a flowchart illustrating the flow of a still image shooting operation process (S205) according to the fifth embodiment.

As illustrated in FIG. 22, in the still image shooting operation process according to the fifth embodiment, first in S2201, the BCPU 327 performs a process similar to the initialization process in S301 in FIG. 3.

In S2202, the BCPU 327 sets the synthesis mode flag to 0. The synthesis mode flag is a flag that is set to 0 when the still image synthesis mode is not set and that is set to 1 when the still image synthesis mode is set. The still image synthesis mode is a mode in which a plurality of still images are synthesized and recorded. The setting of the still image synthesis mode may be set from the menu screen by the menu switch, the selection switch, and the confirmation switch of the camera operating SW 325. Meanwhile, this setting may also be done not from the menu screen but using a dedicated switch. In this case, the camera operating SW 325 may be equipped with a switch for receiving the input of instructions for setting the still image synthesis mode.

In S2203, the BCPU 327 determines whether or not the still image synthesis mode is set.

When the determination result in S2203 is NO, the process proceeds to S2206.

On the other hand, when the determination result in S2203 is YES, in S2204, the BCPU 327 sets the synthesis mode flag to 1.

In S2205, the BCPU 327 calculates the number of images to be synthesized. The number of images to be synthesized is the number of still images to be used for the generation of the synthesized image in S2210 explained later. The number of images to be synthesized is calculated according to the total exposure time set by the user. The total exposure time is the total exposure time of the plurality of still images to be used for the generation of the synthesized image. The setting of the total exposure time may be done by the operations of the camera operating SW 325, for example. As for the calculation of the number of images to be synthesized, assuming the number of images to be synthesized as M, Tv corresponding to the set total exposure time as Tvc, and Tv corresponding to the exposure time in one frame of the frame rate for live view as Tva, the number of images to be synthesized M is calculated using the following formula.

M=2^(Tva−Tvc), here "^" represents exponentiation.

In S2206, the BCPU 327 sets the exposure. Specifically, in S2206 after when the determination result in S2203 is YES, the values of Av and Sv are determined according to the program chart for still image synthesis corresponding to Tvc that is Tv corresponding to the set total exposure time, and the value of Bv corresponding to the subject luminance that was last detected in S314, and the driving of the aperture 205 and the setting of the imaging sensitivity are performed according to the determined values of Av and Sv. On the other hand, in in S2206 after when the determination result in S2203 is NO, the driving of the aperture 205 and the setting of the imaging sensitivity are performed according to the subject luminance that was last detected in S314.

In S2207, the BCPU 327 starts an image pickup device driving process for still images.

In S2208, the image pickup device I/F circuit 307 reads out image signals from the image pickup device 306 and outputs them to the image processing controller 308, under the control of the BCPU 327. The image processing controller 308 stores, in the SDRAM 310, images corresponding to the image signals read out from the image pickup device 306. Here, the stored images correspond to still images.

In S2209, the BCPU 327 determines whether or not the synthesis mode flag is set to 1.

When the determination result in S2209 is NO, the process proceeds to S2212.

On the other hand, when the determination result in S2209 is YES, in S2210, the image processing controller 308 performs an image synthesis process in which a synthesized image equivalent to an image exposed for an exposure time corresponding to the set total exposure is generated by synthesizing images corresponding to the number of images to be synthesized according to the set synthesis processing method, under the control of the BCPU 327. Here, the number of images to be synthesized is the number of images to be synthesized calculated in S2205. The set synthesis processing method is set according the program chart for still image synthesis corresponding to Tvc that is Tv corresponding to the set total exposure time and the value of Bv corresponding to the subject luminance that was last detected in S314.

However, when images corresponding to the number of images to be synthesized are not stored in the SDRAM 310 in S2210, the process proceeds to S2211 without generating the synthesized image.

In S2211, the BCPU 327 determines whether or not the shooting is terminated. In this determination, the determination result becomes YES when the generation of a synthesized image is performed in S2210, and if not, the determination result becomes NO.

When the determination result in S2211 is NO, the process returns to S2208.

On the other hand, when the determination result in S2211 is YES, in S2212 the BCPU 327 terminates the image pickup device driving process for still images.

In S2213, the BCPU 327 performs a developing process. Specifically, in S2213 after the determination result in S2209 is YES, the developing process is applied to the synthesized image generated in S2210. On the other hand, in S2213 after the determination result in S2209 is NO, the developing process is applied to the image corresponding to the image signals read out in S2208.

In S2214, the BCPU 327 displays, on the LCD monitor 313 or the electronic viewfinder 314, the image to which the developing process has been applied in S2213. Meanwhile, the display destination or the output destination of the image to which the developing process has been applied in S2213 is not limited to the LCD monitor 313 or the electronic viewfinder 314 and may be an external display apparatus. In this case, the external display apparatus may be an external display apparatus connected to the external output terminal 312 or may be an external display apparatus wirelessly connected via the wireless circuit 323.

In S2215, the image processing controller 308 records, in the recording medium 309, as an image for the still image, the image to which the development process has been applied in S2213, or the image displayed on the LCD monitor 313 or the electronic viewfinder 314 in S2214, under the control of the BCPU 327. Meanwhile, the recording destination or the output destination of the image for the still image is not limited to the recording medium 309 and may be an external recording apparatus. In this case, the external recording apparatus may be an external recording apparatus connected to the external output terminal 312 or may be an external recording apparatus wirelessly connected via the wireless circuit 323.

When the recording in S2215 is terminated, the still image shooting operation process illustrated in FIG. 22 is terminated.

Figure 23:
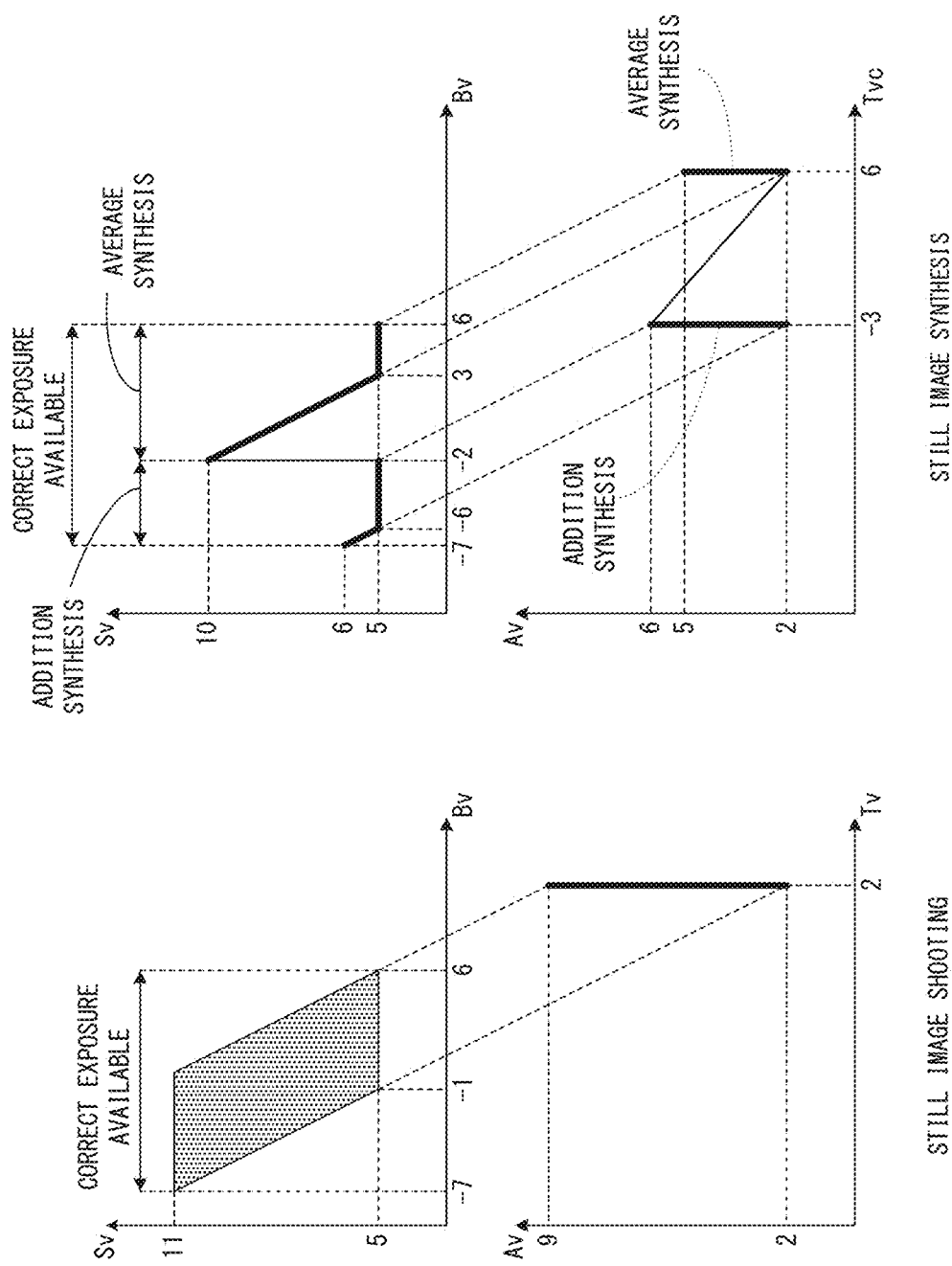
FIG. 23 illustrates an example of a program chart for still images and a program chart for still image synthesis according to the fifth embodiment.

Next, using FIG. 23, an example of the setting of the synthesis processing method used in the image synthesis process (S2210) and the exposure setting (S2206) is explained.

FIG. 23 illustrates an example of a program chart for still images and a program chart for still image synthesis according to the fifth embodiment.

In the setting of the synthesis processing method used in the image synthesis process (S2210), as presented in the program chart for still image synthesis in FIG. 23, the following synthesis processing method is set according to the value of Bv corresponding to the subject luminance that was last detected in S314.

When the value of Bv is $-7 \leq Bv < -2$, the addition synthesis process is set.

When the value of Bv is $-2 \leq Bv \leq 6$, the average synthesis process is set.

In the exposure setting (S2206), as presented in the program chart for still image synthesis in FIG. 23, the following values of Sv and Av are determined according to the value of Bv, and exposure is set according to the value.

When the value of Bv is $-7 \leq Bv < -6$, $Sv=-Bv-1$, $Av=2$
When the value of Bv is $-Bv < -2$, $Sv=5$, $Av=Bv+8$
When the value of Bv is $-2 \leq Bv < 3$, $Sv=-Bv+8$, $Av=2$
When the value of Bv is $3 \leq Bv \leq 6$, $Sv=5$, $Av=Bv-1$ As described above, according to the fifth embodiment, a still image equivalent to an image exposed for an exposure time corresponding to the desired total exposure time may be generated by the synthesis of still images.

Sixth Embodiment

Next, the sixth embodiment is explained. In this explanation, only the points that are different from the first embodiment are explained. In addition, the same numerals are assigned to the same components as in the first embodiment, and explanation for them are omitted.

Figure 24:
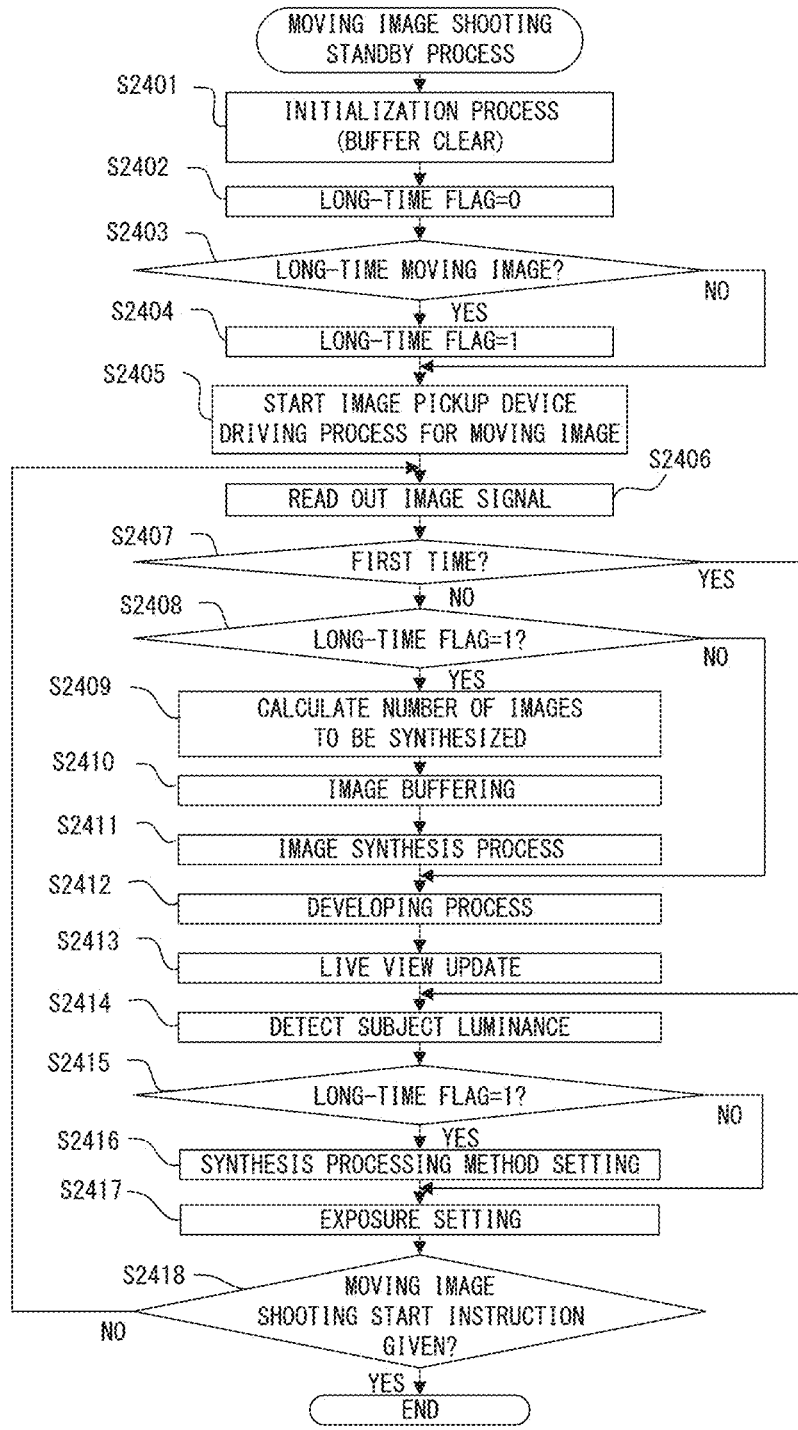
FIG. 24 is a flowchart illustrating the flow of a moving image shooting standby operation process (S207) according to the sixth embodiment.

FIG. 24 is a flowchart illustrating the flow of a moving image shooting standby operation process (S207) according to the sixth embodiment.

The flow of the moving image shooting standby operation process illustrated in FIG. 24 is basically the same as the flow of the still image shooting standby operation process according to the first embodiment illustrated in FIG. 3.

In the moving image shooting standby operation process illustrated in FIG. 24, the processes in S2401 through S2404 are the same as the processes in S301 through S304 in FIG. 3. Meanwhile, in S2403, the determination as to whether it is a long-time moving image or not is done by the BCPU 327. In this determination, when the long-time live view function is set to on, a determination is made that it is a long-time moving image, and when the long-time live view function is set to off, a determination is made that it is not a long-time moving image. Therefore, the determination in S2403 is practically the same as the determination in S303 in FIG. 3.

In S2405, the BCPU 327 starts the image pickup device driving process for moving images. This image pickup device driving process for moving images is practically the same as the image pickup device driving process for live view images started in S305 of FIG. 3.

The processes in S2406 through S2417 are the same as the processes in S306 through S317 in FIG. 3.

In S2418, the BCPU 327 determines whether or not the moving image shooting start instruction has been given. Meanwhile, the moving image shooting start instruction may be given by the release switch.

When the determination result in S2418 is NO, the process proceeds to S2406.

On the other hand, when the determination result in S2418 is YES, the moving image shooting standby operation process illustrated in FIG. 24 is terminated.

Figure 25:
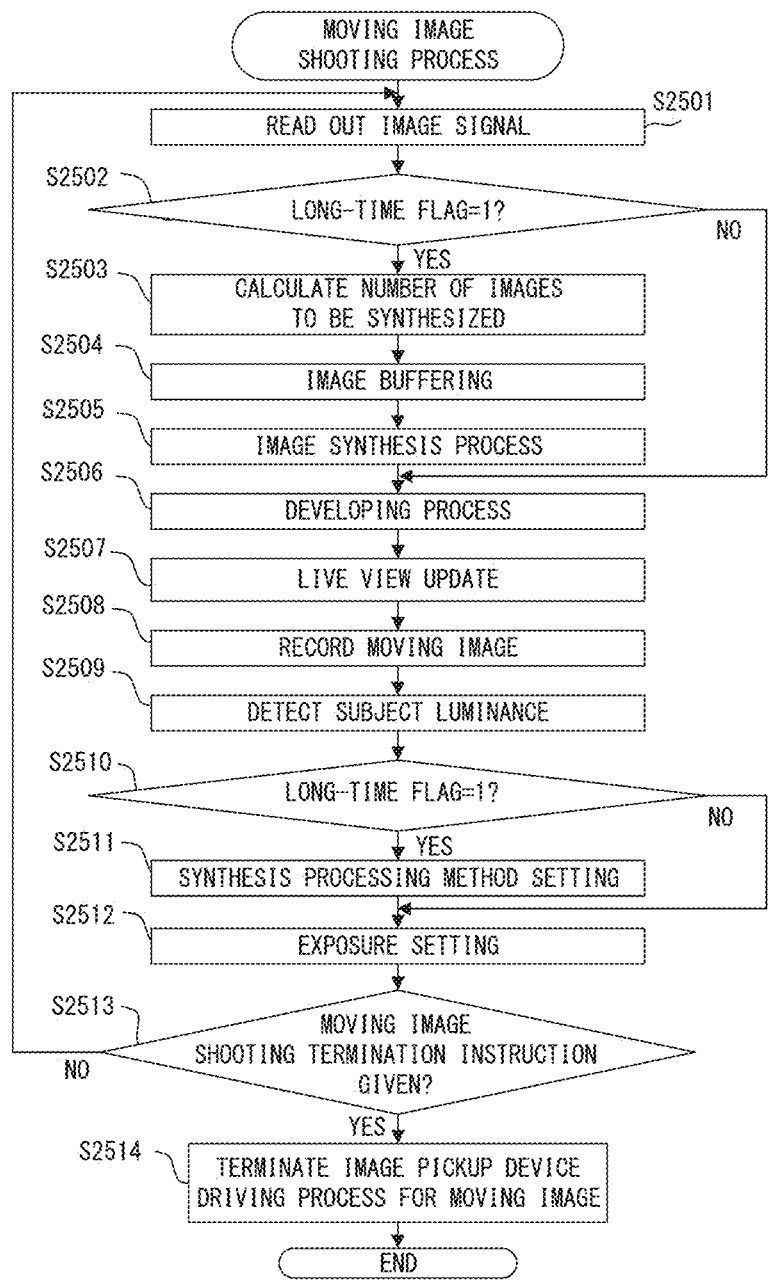
FIG. 25 is a flowchart illustrating the flow of a moving image shooting operation process (S208) according to the sixth embodiment.

FIG. 25 is a flowchart illustrating the flow of a moving image shooting operation process (S208) according to the sixth embodiment.

In the moving image shooting operation process illustrate in FIG. 25, the process in S2501 is the same as the process in S2406 in FIG. 24. The processes in S2502 through S2507 are the same as the processes in S2408 through S2413 in FIG. 24.

In S2508, the image processing controller 308 records, in the recording medium 309, as an image for the moving image, the image to which the development process has been applied in S2506, or the image displayed on the LCD monitor 313 or the electronic viewfinder 314 in S2507, under the control of the BCPU 327. The moving image recorded here is an image for one frame of the moving image. Meanwhile, the recording destination or the output destination of the image for the moving image is not limited to the recording medium 309 and may be an external recording apparatus. In this case, the external recording apparatus may be an external recording apparatus connected to the external output terminal 312 or may be an external recording apparatus wirelessly connected via the wireless circuit 323.

The processes in S2509 through S2512 are the same as the processes in S2414 through S2417.

In S2513, the BCPU 327 determines whether or not a moving image shooting termination instruction has been given. Meanwhile, moving image shooting termination instruction can also be given by the release switch.

When the determination result in S2513 is NO, the process returns to S2501.

On the other hand, when the determination result in S2513 is YES, in S2514, the BCPU 327 terminates the image pickup device driving process for moving images started in S2405, and the moving image shooting operation process illustrated in FIG. 25 is terminated.

Meanwhile, in the sixth embodiment, when the size of the live view image displayed in S2413 and S2507 and the size of the image for the moving image recorded in S2508 are different, it is inefficient to generate each of them separately. Therefore, the size of the image handled in the moving image shooting standby operation process illustrated in FIG. 24 and in moving image shooting operation process illustrated in FIG. 25 may be matched with the image size for the recorded moving image, and in S2413 and S2507, an image with a reduced image size may be displayed. Alternatively, when a high resolution is not required for the image for the moving image, the size of the image handled in the moving image shooting standby operation process illustrated in FIG. 24 and in moving image shooting operation process illustrated in FIG. 25 may be made to be an appropriate image size, and in S2413 and S2507, an image with an expanded image size by up-conversion may be displayed. Meanwhile, the reduction or expansion of the image size is performed in the developing process in S2412 and S2506, for example.

As described above, according to the sixth embodiment, it is possible to have the live view display performed during the moving image shooting standby operation, and during the moving image shooting operation, together with the live view display, recording of moving images or output of moving images to an external apparatus may be performed. In the live view display, naturally, effects similar to those according to the first embodiment may be obtained.

Regarding the setting of a synthesis processing method and determination of values of Sv and Av in the respective embodiments explained above, supplementary explanations are given below.

First, Tva, Tvb, Tvc are defined as follows.

Tva: Tv corresponding to the exposure time of one image before synthesis

Tvb: Tv equivalent to the brightness of the image after synthesis

Tvc: Tv corresponding to the total exposure time of the image after synthesis

Here, the image before synthesis is an imaging frame image. The image after synthesis is a synthesized image. The total exposure time of the image after synthesis is the total of the exposure times of the images before synthesis used for the generation of the image after synthesis.

When the brightness of the image increases A-fold after the synthesis from before the synthesis, it may be expressed as $Tvb=Tva-\log_2 A$. For example, when an addition synthesis is performed for 64 frames of images before synthesis with $Tva=6$, the brightness increases 64-fold, therefore $Tvb=6-\log_2 64=0$. Meanwhile, when an average synthesis is performed for 64 frames of images before synthesis with $Tva=6$, the brightness increases 1-fold, therefore $Tvb=6-\log_2 1=6$.

When N frames of images before synthesis are synthesized, regardless of the synthesis processing method, it may be expressed as $Tvc=Tva-\log_2 N=Tvb+\log 2A-\log_2 N$. For example, when 64 frames of images before synthesis with $Tva=6$ are synthesized, $Tvc=6-\log_2 64=0$. Regarding this, from the viewpoint of the addition synthesis, when an addition synthesis is performed for 64 frames of images before synthesis with $Tva=6$, the brightness increases 64-fold, therefore $Tvc=Tvb+\log_2 64-\log_2 64=Tvb=0$. Meanwhile, from the viewpoint of the average synthesis, when an average synthesis is performed for 64 frames of images before synthesis with $Tva=6$, the brightness increases 1-fold, therefore $Tvc=Tvb+\log_2 1-\log_2 4=Tvb-6=0$. That is, $Tvc=0$ is established regardless of the synthesis processing method.

Meanwhile, $Tv_0$, $Tva_0$, $Tvc_0$ are defined as follows.

$Tv_0$: Tv equivalent to the exposure time for still image shooting set by the user $Tva_0$: Tv equivalent to the exposure time of one frame of live view $Tvc_0$: Tv equivalent to the exposure time of the live view image according to the synthesis Here, the exposure time of for the time of shooting still images set by the user is the shutter speed for shooting. In the relationship of $Tva_0$ and $Tv_0$, the relationship is $Tva_0>Tv_0$. When the long-time live view function is set to on, in order to make the exposure time of the live view image according to the synthesis equivalent to the exposure time of for the time of shooting still images, the relationship is $Tvc_0=Tv_0$. In the case of the addition synthesis, the relationship is $Tvb=Tvc_0$. In the case of the average synthesis, the relationship is $Tvb=Tva_0$.

In addition, it is assumed that the camera 100 is able to perform still image shooting in the following range.

Maximum aperture: $Av_{min}$
Minimum aperture: $Av_{max}$
Minimum sensitivity: $Sv_{min}$
Maximum sensitivity: $Sv_{max}$ Here, the maximum aperture is the state in which the aperture area by the aperture 205 is largest, and the value of Av corresponding to this state becomes minimum. The minimum aperture is the state in which the aperture area by the aperture 205 is smallest, and the value of Av corresponding to this state becomes maximum.

Meanwhile, the range of luminance with which the correct exposure may be obtained in still image shooting is expressed as follows, according to the relationship $Tv+Av=Sv+Bv$.

Minimum luminance: $Bv_{min}=Tv_0+Av_{min}-Sv_{max}$
Maximum luminance: $Bv_{max}=Tv_0+Av_{max}-Sv_{min}$ With these assumptions, first, a supplementary explanation is given about the first embodiment.

Here, it is assumed that there is a following limitation on the minimum aperture in live view.

Minimum aperture in live view: $Av_{max}'<Av_{max}$

The range of luminance with which the correct exposure may be obtained by the addition synthesis is expressed as follows.

Minimum luminance: $BV_{min}(\text{addition})=Tvc_0+Av_{min}-Sv_{max}$

Maximum luminance: $BV_{max}(\text{addition})=Tvc_0+Av_{max}'-Sv_{min}$

Here, $BV_{min}(\text{addition})=BV_{min}$, and $BV_{max}(\text{addition})<BV_{max}$ also hold true.

The range of luminance with which the correct exposure may be obtained by the average synthesis is expressed as follows Minimum luminance: $BV_{min}(\text{average})=Tva_0+Av_{min}-Sv_{max}$ Maximum luminance: $BV_{max}(\text{average})=Tva_0+Av_{max}'-Sv_{min}$ Here, $BV_{min}(\text{average})>BV_{min}(\text{addition})$, and $Bv_{max}(\text{average})>Bv_{max}(\text{addition})$ also hold true.

In the example explained using FIG. 7 and FIG. 8, the synthesis processing method is set as follows according to the value of Bv corresponding to the detected subject luminance. The setting method is also a setting method in which priority is given to the addition synthesis process.

$Bv_{min} \leq Bv \leq Bv_{max}(\text{addition})$: Addition synthesis process
$Bv_{max}(\text{addition}) < Bv \leq Bv_{max}$: Average synthesis process In addition, in the case of the example explained using FIG. 9, the synthesis processing method is set as follows according to the value of Bv corresponding to the detected subject luminance. The setting method is also a setting method in which priority is given to the average synthesis process.

$BV_{min} \leq Bv < Bv_{min}(\text{average})$: Addition synthesis process
$Bv_{min}(\text{average}) \leq Bv \leq Bv_{max}$: Average synthesis process The values of Av, Sv are determined as values that satisfy the following relational expressions.

Addition synthesis process: $Av-Sv=Bv-Tvc_0$
Average synthesis process: $Av-Sv=Bv-Tva_0$ There is a degree of freedom in how to determine the values of Av and Sv according to these relational expressions, and therefore, the determination is made uniquely by setting conditions. In the case of the first embodiment, a condition for making the value of Sv becomes minimum is set.

Next, a supplementary explanation is given about the second embodiment.

When an added-by-weight synthesis is performed with the weight W and the number N of images to be synthesized, the brightness increases N*W-fold after the synthesis from before the synthesis, and it is expressed as $Tvb=Tva_0-\log_2 NW=(Tva_0-\log_2 N)-\log_2 W=Tvc_0-\log_2 W$.

In the second embodiment, in order to avoid jumps in the aperture and sensitivity, that is, jumps in Av and Sv, limitations are set as follows.

Addition synthesis process: $Av=Av_{min}$

Added-by-weight synthesis process: $Av=Av_{min}$, $Sv=Sv_{min}$, $1/N<W<1$

Average synthesis process: $Sv=Sv_{min}$

Under these limitations, the range of luminance with which the correct exposure may be obtained by the addition synthesis is expressed as follows.

Minimum luminance: $Bv_{min}(\text{addition})=Tvc_0+Av_{min}-Sv_{max}$

Maximum luminance: $BV_{max}(\text{addition})=Tvc_0+Av_{min}-Sv_{min}$

Here, $Bv_{min}(\text{addition})=Bv_{min}$ also holds true.

The range of luminance with which the correct exposure may be obtained by the added-by-weight synthesis is expressed as follows.

Minimum luminance: $Bv_{min}(\text{added-by-weight})=Tvc_0+Av_{min}-Sv_{min}$

Maximum luminance: $BV_{max}(\text{added-by-weight})=Tva_0+Av_{min}-Sv_{min}$

Here, $Bv_{min}(\text{added-by-weight})=BV_{max}(\text{addition})$ $Bv_{max}(\text{added-by-weight})=Bv_{min}(\text{average})$ also hold true.

The range of luminance with which the correct exposure may be obtained by the average synthesis is expressed as follows.

Minimum luminance: $Bv_{min}(\text{average})=Tva_0+Av_{min}-Sv_{min}$

Maximum luminance: $Bv_{max}(\text{average})=Tva_0+Av_{max}'-Sv_{min}$

In the example explained using FIG. 13 and FIG. 14, the synthesis processing method is set as follows according to the value of Bv corresponding to the detected subject luminance.

$Bv_{min} \leq Bv \leq Bv_{max}(\text{addition})$: Addition synthesis process $BV_{max}(\text{addition}) < Bv < Bv_{min}(\text{average})$: an added-by-weight synthesis process $Bv_{min}(\text{average}) \leq Bv \leq Bv_{max}$: Average synthesis process The values of Av, Sv are determined as follows.

Addition synthesis process: $Av=Av_{min}$, $Sv=Tvc_0+Av_{min}-Bv$

Added-by-weight synthesis process: $Av=Av_{min}$, $Sv=Sv_{min}$, here, the weight W is a value that satisfies $\log_2 W=Tvc_0+Av_{min}-Sv_{min}-Bv$ Average synthesis process: $Av=Bv+Sv_{min}-Tva_0$, $Sv=Sv_{min}$ In addition, in the example explained using FIG. 15 and FIG. 16, the synthesis processing method is set as follows according to the value of Bv corresponding to the detected subject luminance.

$Bv_{min} \leq Bv \leq Bv_{max}(\text{addition})$: Addition synthesis process $Bv<BV_{min}(\text{addition})$, $BV_{max}(\text{addition})<Bv$: an added-by-weight synthesis process The example explained using FIG. 15 and FIG. 16 is an example in which the value of Av is fixed, therefore Av=5.

The value of Sv is determined according to the value of Bv.

Next, a supplementary explanation is given about the third embodiment.

In the third embodiment, according to the value of Sv, the synthesis processing methods are set as follows.

$Sv_0 \leq Sv \leq Sv_{max}$: Addition synthesis process $Sv_{min} \leq Sv < Sv_0$: Average synthesis process Meanwhile, the range of Sv for executing the addition synthesis process, the range of Sv for executing the average synthesis process are determined in advance.

Under this limitation, Av is determined.

Next, a supplementary explanation is given about the fourth embodiment.

In the fourth embodiment, according to the value of Av, the synthesis processing methods are set as follows.

$Av_{min} \leq Av \leq Av_0$: Addition synthesis process $Av_0<Av \leq Av_{max}'$: Average synthesis process Meanwhile, the range of Av for executing the addition synthesis process, the range of Av for executing the average synthesis process are determined in advance.

Under this limitation, Sv is determined.

Next, a supplementary explanation is given about the fifth embodiment.

Here, a case is assumed in which an average synthesis of M pieces of images captured with $Tv=Tv_0$ is performed to generate and record a still image. In this case, Tva, Tvb, Tvc regarding the still image after synthesis is expressed as follows.

$Tva=Tv_0$ $Tvb=Tv_0$ $Tvc=Tv_0-\log_2 M$

Meanwhile, the brightness does not change before and after the synthesis with the average synthesis, therefore $Tvb=Tv_0$.

In the still image synthesis mode, Tva, Tvb, Tvc are expressed as follow.

$Tva=Tva_0$

Tvb in the case of the addition synthesis process$=Tv_0-\log_2 M$

Tvb in the case of the average synthesis process$=Tva_0$ $Tvc=Tv_0-\log_2 M$

At this time, the range of luminance with which the correct exposure may be obtained by the addition synthesis process is expressed as follows.

Minimum luminance: $BV_{min}(\text{addition})=Tv_0-\log_2 M+Av_{min}-Sv_{max}$

Maximum luminance: $BV_{max}(\text{addition})=Tv_0-\log_2 M+Av_{max}'-Sv_{min}$

In addition, the range of luminance with which the correct exposure may be obtained by the average synthesis process is expressed as follows.

Minimum luminance: $BV_{min}(\text{average})=Tva_0+Av_{min}-Sv_{max}$

Maximum luminance: $BV_{max}(\text{average})=Tva_0+Av_{max}'-Sv_{min}$

In the example explained using FIG. 23, the synthesis processing method is set as follows according to the value of Bv corresponding to the detected subject luminance.

$Bv_{min} \leq Bv \leq Bv_{max}(\text{addition})$: Addition synthesis process $Bv_{max}(\text{addition})<Bv \leq Bv_{max}$: Average synthesis process The values of Av, Sv are determined in a similar manner as in the first embodiment.

Regarding the sixth embodiment, the synthesis processing method, the value of Sv, and the value of Av are determined in a similar manner as in the first embodiment.

Meanwhile, in the respective embodiments explained above, the processes of the addition synthesis process, the average synthesis process, and the added-by-weight synthesis process may also be executed following the procedures of the image synthesis processes disclosed in Japanese Patent Application No. 2017-218733 filed previously by the present applicant. In this case, for example, in the addition synthesis process, a cumulative addition of images is performed with the gain value being 1, and in the average synthesis process, a cumulative addition of images is performed with the gain value being 1/the number of images to be synthesized.

According to the respective embodiments explained above, effects are provided in which, in the live view display, shooting effects in the case in which the shutter speed is set to a low speed may be obtained, and also, an image of an appropriate brightness may be obtained.

Meanwhile, embodiments are not limited exactly to the respective embodiments described above, and at the stage of implementation, embodiments may be made while applying variation to the components without departing from their scope. In addition, various embodiments may be formed by appropriately combining a plurality of components disclosed in the respective embodiments described above. For example, some components may be deleted from among all the components presented in the embodiments. In addition, components across different embodiments may be appropriately combined.

What is claimed is:

1. An imaging apparatus comprising:
    an exposure time setting circuit configured to set an exposure time for shooting;
    an imaging sensor configured to image an image of a subject by repeating exposure and output of an image signal at a specified time interval;
    a microcomputer that includes a unit configured to perform processes as follows
        a synthesis process setting unit configured to set a synthesis processing method in which outputs of image signals corresponding to respective pixels are cumulatively processed for a plurality of image signals continuously output from the imaging sensor;
    an image processing circuit that includes an image synthesis circuit configured to generate a synthesized image according to a synthesis processing method set by the synthesis process setting unit, for the plurality of image signals continuously output from the imaging sensor, and based on image signal outputs corresponding respectively to pixels of identical addresses; and
    a display configured to display an image, wherein
    the synthesis process setting unit sets, in the image synthesis circuit, a synthesis processing method for making brightness of a synthesized image generated by the image synthesis circuit to be specified brightness;
    the image synthesis circuit generates a synthesized image to be an image equivalent to an exposure time set by the exposure time setting circuit, by synthesizing a plurality of images based on image signals repeatedly output by the image sensor according to a synthesis processing method set by the synthesis process setting unit; and
    the display displays an image based on a synthesized image generated by the image synthesis circuit.

2. The imaging apparatus according to claim 1, further comprising an exposure time input circuit configured to input the exposure time for shooting, wherein
    the exposure time setting circuit sets the exposure time for shooting input by the exposure time input circuit.

3. The imaging apparatus according to claim 1, wherein the exposure time for shooting is a time that is longer than the specified time interval.

4. The imaging apparatus according to claim 1, wherein the display updates display of an image based on a synthesized image generated by the image synthesis circuit at a time interval that is shorter than an exposure time set by the exposure time setting circuit.

5. The imaging apparatus according to claim 1, wherein a number of images that the image synthesis circuit uses to generate a synthesized image is determined according to a value obtained by dividing an exposure time set by the exposure time setting circuit by the specified time interval.

6. The imaging apparatus according to claim 1, wherein the synthesis process setting unit sets one of an addition synthesis process, an average synthesis process, and an added-by-weight synthesis process in the image synthesis circuit as the synthesis processing method.

7. The imaging apparatus according to claim 1, wherein the synthesis process setting unit sets, in the image synthesis circuit, a synthesis processing method determined according to at least one of a subject luminance, a shutter speed, an aperture, and an imaging sensitivity.

8. The imaging apparatus according to claim 1, wherein the microcomputer further comprises an exposure setting unit configured to set at least one of an aperture and an imaging sensitivity.

9. The imaging apparatus according to claim 1, further comprising a memory configured to record, as a still image, an image based on a synthesized image generated by the image synthesis circuit.

10. The imaging apparatus according to claim 1, further comprising a memory configured to record, as a moving image, images based on a plurality of synthesized images generated by the image synthesis circuit as a moving image.

11. The imaging apparatus according to claim 1, further comprising a memory configured to record an image, wherein
    the imaging sensor further performs exposure for an exposure time set by the exposure time setting circuit and output of an image signal, and
    the memory records a still image based on an image signal output by the imaging sensor.

12. The imaging apparatus according to claim 1, further comprising a memory configured to record an image, wherein
    the imaging sensor further repeats exposure for an exposure time set by the exposure time setting circuit and output of an image signal, and
    the memory records a moving image based on image signals repeatedly output by the imaging sensor.

13. The imaging apparatus according to claim 1, further comprising an output circuit configured to output, as a still image, an image based on a synthesized image generated by the image synthesis circuit to an external apparatus.

14. The imaging apparatus according to claim 1, further comprising an output circuit configured to output, as a moving image, images based on a plurality of synthesized images generated by the image synthesis circuit to an external apparatus.

15. The imaging apparatus according to claim 1, further comprising an output circuit configured to output an image to an external apparatus, wherein
    the imaging sensor further performs exposure for an exposure time set by the exposure time setting circuit and output of an image signal, and the output circuit outputs a still image based on an image signal output by the imaging sensor to the external apparatus.

16. The imaging apparatus according to claim 1, further comprising an output circuit configured to output an image to an external apparatus, wherein
the imaging sensor further repeats exposure for an exposure time set by the exposure time setting circuit and output of an image signal, and
the output circuit outputs a moving image based on image signals repeatedly output by the imaging sensor to the external apparatus.

17. The imaging apparatus according to claim 1, wherein
the image synthesis circuit generates the synthesized image by synthesizing the plurality of images according to a synthesis processing method in which a synthesis processing method set by the synthesis process setting unit and a synthesis processing method set previously by the synthesis process setting unit are combined.

18. A display method comprising:
setting an exposure time for shooting;
imaging an image of a subject by repeating exposure and output of an image signal at a specified time interval;
setting a synthesis processing method in which outputs of image signals corresponding to respective pixels are cumulatively processed for the plurality of image signals output continuously;
generating a synthesized image according to the synthesis processing method, for a plurality of image signals output continuously, and based on image signals outputs corresponding respectively to pixels of identical addresses; and
displaying an image, wherein
in the setting of a synthesis processing method, a synthesis processing method is set for making brightness of a synthesized image generated by the generating of a synthesized image to be specified brightness;
in the generating of a synthesized image, a synthesized image to be an image equivalent to an exposure time set by the setting of an exposure time is generated by synthesizing a plurality of images based on image signals repeatedly output by the imaging of an image according to a synthesis processing method set by the setting of a synthesis processing method; and
in the displaying, an image based on a synthesized image generated by the generating of a synthesized image is displayed.

19. The display method according to claim 18, further comprising inputting the exposure time for shooting, wherein
in the setting of an exposure time, the exposure time for shooting that has been input by the inputting of the exposure time is set.

20. The display method according to claim 18, wherein the exposure time for shooting is a time that is longer than the specified time interval.

21. The display method according to claim 18, wherein in the displaying, display of an image based on a synthesized image generated by the generating of a synthesized image is updated at a time interval that is shorter than an exposure time set by the setting of an exposure time.

* * * * *